(12) United States Patent
Zhang et al.

(10) Patent No.: US 8,073,125 B2
(45) Date of Patent: Dec. 6, 2011

(54) SPATIAL AUDIO CONFERENCING

(75) Inventors: Zhengyou Zhang, Bellevue, WA (US); James Johnston, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1106 days.

(21) Appl. No.: 11/861,238

(22) Filed: Sep. 25, 2007

(65) Prior Publication Data

US 2009/0080632 A1    Mar. 26, 2009

(51) Int. Cl.
H04M 3/42    (2006.01)
(52) U.S. Cl. ............ 379/202.01; 381/58; 381/182; 709/204; 709/227
(58) Field of Classification Search ......... 379/202.01; 381/58, 182; 709/204, 227
See application file for complete search history.

(56) References Cited

U.S. PATENT DOCUMENTS

| | | | |
|---|---|---|---|
| 4,630,298 A * | 12/1986 | Polk et al. ............ 381/1 |
| 5,546,465 A * | 8/1996 | Kim ............... 381/18 |
| 5,991,385 A | 11/1999 | Dunn et al. |
| 6,011,851 A | 1/2000 | Connor et al. |
| 6,327,567 B1 | 12/2001 | Willehadson et al. |
| 6,845,163 B1 | 1/2005 | Johnston et al. |
| 6,931,113 B2 | 8/2005 | Ortel |
| 7,012,630 B2 | 3/2006 | Curry et al. |
| 7,092,002 B2 | 8/2006 | Ferren et al. |
| 7,177,413 B2 | 2/2007 | O'Toole |
| 7,720,212 B1 * | 5/2010 | Jouppi et al. ............ 379/202.01 |
| 2006/0013416 A1 | 1/2006 | Truong et al. |
| 2006/0104458 A1 | 5/2006 | Kenoyer et al. |
| 2006/0171547 A1 | 8/2006 | Lokki et al. |
| 2007/0147634 A1 * | 6/2007 | Chu .................. 381/92 |
| 2008/0144864 A1 * | 6/2008 | Huon .................. 381/305 |

OTHER PUBLICATIONS

Baldis, J., Effects of spatial audio on memory, compression, and preference during desktop conferences, Proc. of the CHI Conf. on Human Factors in Computing Sys., 2001, pp. 166-173, ACM Press.
Billinghurst, M., J. Bowskill, M. Jessop, J. Morphett, A wearable spatial conferencing space, Proc. of ISWC '98, 1998, pp. 76-83, IEEE Press.
Cheng, C. I. and G. H. Wakefield, Introduction to head-related transfer functions (HRTF's): Representations of HRTF's in time, frequency, and space, Journal of Audio Engineering Society (JAES), Apr. 2001, pp. 231-249, vol. 49, No. 4, New York.
Hardman, V. J., M. Iken, Enhanced reality audio in interactive networked environments, Proc. Framework for Interactive Virtual Environments (FIVE) Conf., Pisa, Italy, Dec. 1996.

(Continued)

*Primary Examiner* — Quynh Nguyen
(74) *Attorney, Agent, or Firm* — Lyon & Harr, LLP; Richard T. Lyon

(57) ABSTRACT

Audio in an audio conference is spatialized using either virtual sound-source positioning or sound-field capture. A spatial audio conference is provided between a local and remote parties using audio conferencing devices (ACDs) interconnected by a network. Each ACD captures spatial audio information from the local party, generates either one, or three or more, audio data streams which include the captured information, and transmits the generated stream(s) to each remote party. Each ACD also receives the generated audio data stream(s) transmitted from each of the remote parties, processes the received streams to generate a plurality of audio signals, and renders the signals to produce a sound-field that is perceived by the local party, where the sound-field includes the spatial audio information captured from the remote parties. A sound-field capture device is also provided which includes at least three directional microphones symmetrically configured about a center axis in a semicircular array.

23 Claims, 11 Drawing Sheets

OTHER PUBLICATIONS

Johnston, J. D., Perceptual soundfield reconstruction, Audio Engineering Society, Oct. 2000, Los Angeles, CA.

Vesterinen, L., Audio conferencing enhancements, Jun. 2006, Master's Thesis, University of Tampere.

Yankelovich, N., J. Kaplan, M. Wessler, J. Provino, and J. DiMicco, Improving audio conferencing: Are two ears better than one?, Proceedings of the 2006 ACM Conf. on Comp.-Supported Cooperative Work, Nov. 4-8, 2006, Banff, Alberta, Canada.

* cited by examiner

SPATIAL AUDIO CONFERENCING

BACKGROUND

Various techniques exist to provide for collaboration between parties situated remotely from one another. Two popular examples of such techniques that support live collaboration are audio conferencing and video conferencing. Audio conferencing systems provide for the live exchange and mass articulation of audio information between two or more parties situated remotely from one another and linked by a communications network. Video conferencing systems on the other hand generally provide for the live exchange of both video and audio information between the parties. Despite the audio-only nature of audio conferencing systems, they are still quite popular and are frequently employed because of their ease of use, high reliability, support for live collaboration between a reasonably large number of parties, compatibility with ubiquitous global communications networks, overall cost effectiveness, and the fact that they don't generally require any specialized equipment.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

The present spatial audio conferencing technique generally involves spatializing the audio in an audio conference by using one of two different methods, a virtual sound-source positioning method and a sound-field capture method. The resulting spatial audio is perceived by conferencees participating in the audio conference to have a three dimensional (3D) effect in which a plurality of different sounds are perceived to emanate from a plurality of different reproduced sound-sources distributed in 3D space. The provision of spatial audio in an audio conference significantly improves the quality and effectiveness of the audio conference.

In one embodiment, the present spatial audio conferencing technique provides a spatial audio conference between a local party and one or more remote parties, each of which is situated at a different venue. This is accomplished using a plurality of audio conferencing devices (ACDs) which are interconnected by a network, and a computer program that is executed by each ACD. Each venue includes an ACD. The computer program includes the following program modules. One program module captures spatial audio information emanating from the local party and processes the captured audio information to generate a single audio data stream which includes the captured information. Another program module transmits the single audio data stream over the network to each remote party, and receives the single audio data stream which is transmitted over the network from each remote party. Yet another program module processes the received audio data streams to generate a plurality of audio signals, and renders the audio signals to produce a sound-field which is perceived by the local party, where the sound-field includes the spatial audio information captured from the remote parties.

In another embodiment of the present technique, the computer program includes the following program modules. One program module captures spatial audio information emanating from the local party and processes the captured audio information to generate one audio data stream whenever there is only one conferencee in the local party, and three or more audio data streams whenever there are a plurality of conferencees in the local party, where the generated audio data stream(s) includes the captured information. Another program module transmits the generated audio data stream(s) over the network to each remote party. Yet another program module receives the one audio data stream which is transmitted over the network from each remote party containing only one conferencee, and the three or more audio data streams which are transmitted over the network from each remote party containing a plurality of conferencees. Yet another program module processes the received audio data streams to generate a plurality of audio signals, and renders the audio signals to produce a sound-field which is perceived by the local party, where the sound-field includes the spatial audio information captured from the remote parties.

In yet another embodiment, the present technique includes a sound-field capture device for capturing spatial audio information from a sound-field. The device includes at least three microphones configured in a semicircular array. The microphones are disposed symmetrically about a center axis. Each microphone includes a directional sound capture element.

In addition to the just described benefits, other advantages of the present technique will become apparent from the detailed description which follows hereafter when taken in conjunction with the drawing figures which accompany the detailed description.

DESCRIPTION OF THE DRAWINGS

The specific features, aspects, and advantages of the present spatial audio conferencing technique will become better understood with regard to the following description, appended claims, and accompanying drawings where:

DETAILED DESCRIPTION

In the following description of embodiments of the present spatial audio conferencing technique reference is made to the accompanying drawings which form a part hereof, and in which are shown, by way of illustration, specific embodiments in which the present technique may be practiced. It is understood that other embodiments may be utilized and structural changes may be made without departing from the scope of the present technique.

The term "conferencee" is used herein to refer to a person that is participating in an audio conference. The term "party" is used herein to refer to either a single conferencee that is situated at a particular venue by themselves, or a plurality of conferencees that are co-situated at a particular venue. The term "reproduced sound-source" is used herein to refer to a particular spatial location that is audibly perceived as sourcing sound. The term "spatial audio" is used herein to refer to a particular type of audio that when audibly rendered is perceived to have a three dimensional (3D) effect in which a plurality of different sounds are perceived to emanate from a plurality of different reproduced sound-sources distributed in 3D space. The term "spatial audio conference" is used herein to refer to an audio conference that contains spatial audio information. In other words, generally speaking, the audio conferencing system used to provide for an audio conference between parties has spatial audio capabilities in which spatial audio information is captured from each party and transmitted to the other parties, and spatial audio information is received from the other parties is audibly rendered in a spatial format for each party to hear.

1.0 Computing Environment

Before providing a description of embodiments of the present spatial audio conferencing technique, a brief, general description of a suitable computing system environment in which portions thereof may be implemented will be described. This environment provides the foundation for the operation of embodiments of the present technique which are described hereafter. The present technique is operational with numerous general purpose or special purpose computing system environments or configurations. Exemplary well known computing systems, environments, and/or configurations that may be suitable include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the aforementioned systems or devices, and the like. The present technique is also operational with a variety of phone devices which will be described in more detail hereafter.

Figure 1:
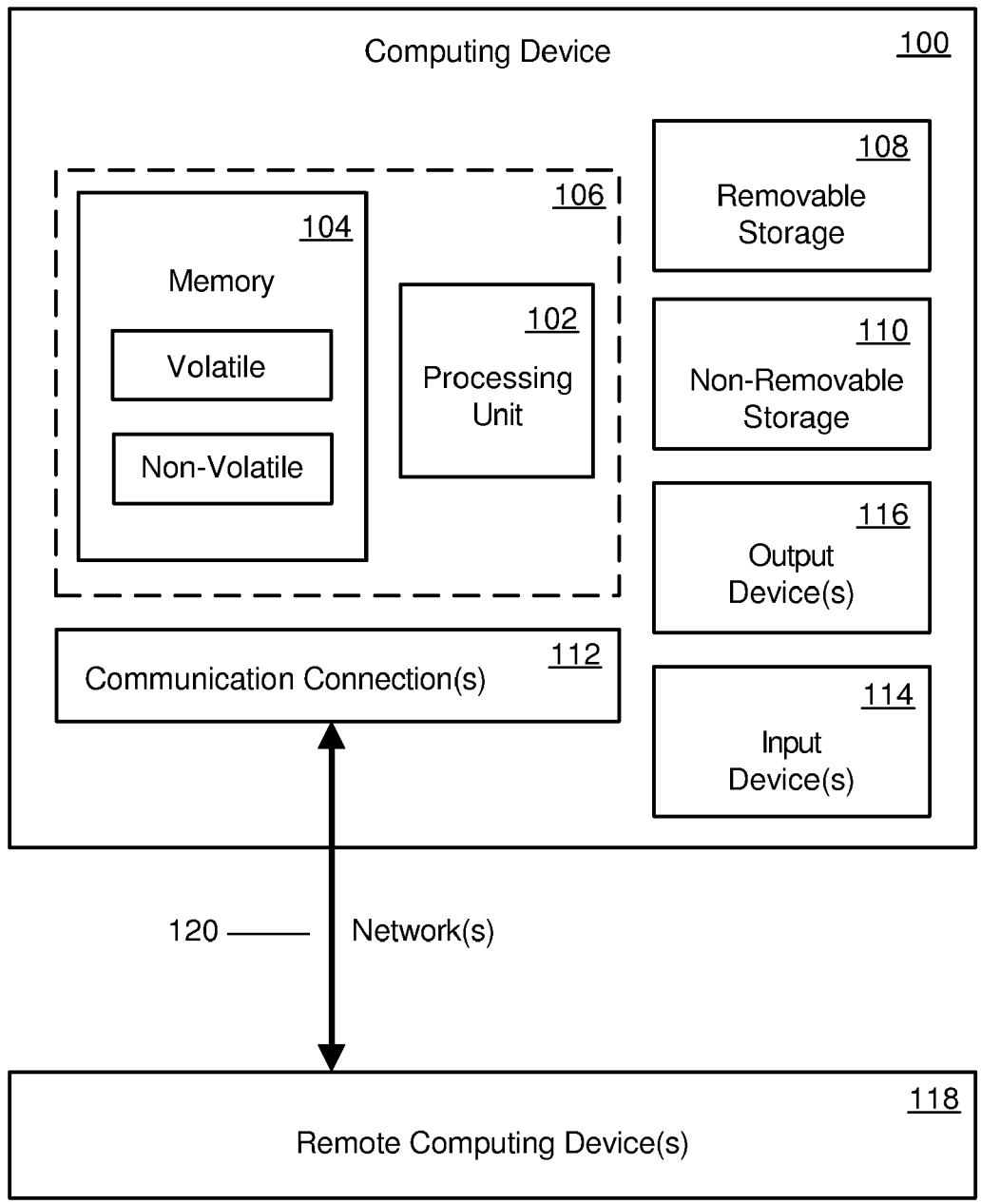
FIG. 1 illustrates a diagram of an exemplary embodiment of general purpose, network-based computing devices which constitute an exemplary system for implementing embodiments of the present spatial audio conferencing technique.

FIG. 1 illustrates a diagram of an exemplary embodiment of a suitable computing system environment according to the present technique. The environment illustrated in FIG. 1 is only one example of a suitable computing system environment and is not intended to suggest any limitation as to the scope of use or functionality of the present technique. Neither should the computing system environment be interpreted as having any dependency or requirement relating to any one or combination of components exemplified in FIG. 1.

As illustrated in FIG. 1, an exemplary system for implementing the present technique includes one or more computing devices, such as computing device 100. In its simplest configuration, computing device 100 typically includes at least one processing unit 102 and memory 104. Depending on the specific configuration and type of computing device, the memory 104 may be volatile (such as RAM), non-volatile (such as ROM and flash memory, among others) or some combination of the two. This simplest configuration is illustrated by dashed line 106.

As exemplified in FIG. 1, computing device 100 can also have additional features and functionality. By way of example, computing device 100 can include additional storage such as removable storage 108 and/or non-removable storage 110. This additional storage includes, but is not limited to, magnetic disks, optical disks and tape. Computer storage media includes volatile and non-volatile media, as well as removable and non-removable media implemented in any method or technology. The computer storage media provides for storage of various information required to operate the device 100 such as computer readable instructions associated with an operating system, application programs and other program modules, and data structures, among other things. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Any such computer storage media can be part of computing device 100.

As exemplified in FIG. 1, computing device 100 also includes a communications connection(s) 112 that allows the device to operate in a networked environment and communicate with a remote computing device(s), such as remote computing device(s) 118. Remote computing device(s) 118 can be a PC, a server, a router, a peer device or other common network node, and typically includes many or all of the elements described herein relative to computing device 100. Communication between computing devices takes place over a network(s) 120, which provides a logical connection(s) between the computing devices. The logical connection(s) can include one or more different types of networks including, but not limited to, a local area network(s) and wide area network(s). Such networking environments are commonplace in conventional offices, enterprise-wide computer networks, intranets and the Internet. It will be appreciated that the communications connection(s) 112 and related network (s) 120 described herein are exemplary and other means of establishing communication between the computing devices can be used.

As exemplified in FIG. 1, communications connection(s) 112 and related network(s) 120 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media. The term "computer readable media" as used herein includes both storage media and communication media.

As exemplified in FIG. 1, computing device 100 also includes an input device(s) 114 and output device(s) 116. Exemplary input devices 114 include, but are not limited to, a keyboard, mouse, pen, touch input device, audio input devices, and cameras, among others. A user can enter commands and various types of information into the computing device 100 through the input device(s) 114. Exemplary audio input devices (not illustrated) include, but are not limited to, a single microphone, a plurality of microphones in an array, a single audio/video (A/V) camera, and a plurality of A/V cameras in an array. These audio input devices are used to capture a user's, or co-situated group of users', voice(s) and other audio information. Exemplary output devices 116 include, but are not limited to, a display device(s), a printer, and audio output devices, among others. Exemplary audio output devices (not illustrated) include, but are not limited to, a single loudspeaker, a plurality of loudspeakers, and headphones. These audio output devices are used to audibly play audio information to a user or co-situated group of users. With the exception of microphones, loudspeakers and headphones which are discussed in more detail hereafter, the rest of these input and output devices are well known and need not be discussed at length here.

The present technique can be described in the general context of computer-executable instructions, such as program modules, which are executed by computing device 100. Generally, program modules include routines, programs, objects, components, and data structures, among other things, that perform particular tasks or implement particular abstract data types. The present technique can also be practiced in a distributed computing environment where tasks are performed by one or more remote computing devices 118 that are linked through a communications network 112/120. In a distributed computing environment, program modules may be located in both local and remote computer storage media including, but not limited to, memory 104 and storage devices 108/110.

An exemplary environment for the operation of embodiments of the present technique having now been described, the remainder of this Detailed Description section is devoted to a description of the systems, processes and devices that embody the present technique.

2.0 Spatial Audio Conferencing

The present technique generally spatializes the audio in an audio conference between a plurality of parties situated remotely from one another. This is in contrast to conventional audio conferencing systems which generally provide for an audio conference that is monaural in nature due to the fact that they generally support only one audio stream (herein also referred to as an audio channel) from an end-to-end system perspective (i.e. between the parties). More particularly, the present technique generally involves two different methods for spatializing the audio in an audio conference, a virtual sound-source positioning (VSP) method and a sound-field capture (SFC) method. Both of these methods are described in detail hereafter.

The present technique generally results in each conferences being more completely immersed in the audio conference and each conferences experiencing the collaboration that transpires as if all the conferencees were situated together in the same venue. As will become apparent from the description that follows, the present technique can be used to add spatial audio capabilities into conventional audio conferencing systems for minimal added cost and a minimal increase in system complexity.

2.1 Human Perception

Using their two ears, a human being can generally audibly perceive the direction and distance of a sound-source. Two cues are primarily used in the human auditory system to achieve this perception. These cues are the inter-aural time difference (ITD) and the inter-aural level difference (ILD) which result from the distance between the human's two ears and shadowing by the human's head. In addition to the ITD and ILD cues, a head-related transfer function (HRTF) is used to localize the sound-source in 3D space. The HRTF is the frequency response from a sound-source to each ear, which can be affected by diffractions and reflections of the soundwaves as they propagate in space and pass around the human's torso, shoulders, head and pinna. Therefore, the HRTF for a sound-source generally differs from person to person.

In an environment where a plurality of people are talking at the same time, the human auditory system generally exploits information in the ITD cue, ILD cue and HRTF, and provides the ability to selectively focus one's listening attention on the voice of a particular talker. This selective attention is known as the "cocktail party effect." In addition, the human auditory system generally rejects sounds that are uncorrelated at the two ears, thus allowing the listener to focus on a particular talker and disregard sounds due to venue reverberation.

The ability to discern or separate apparent sound-sources in 3D space is known as sound spatialization. The human auditory system has sound spatialization abilities which generally allow a human being to separate a plurality of simultaneously occurring sounds into different auditory objects and selectively focus on (i.e. primarily listen to) one particular sound.

2.2 General Architecture

Figure 2:
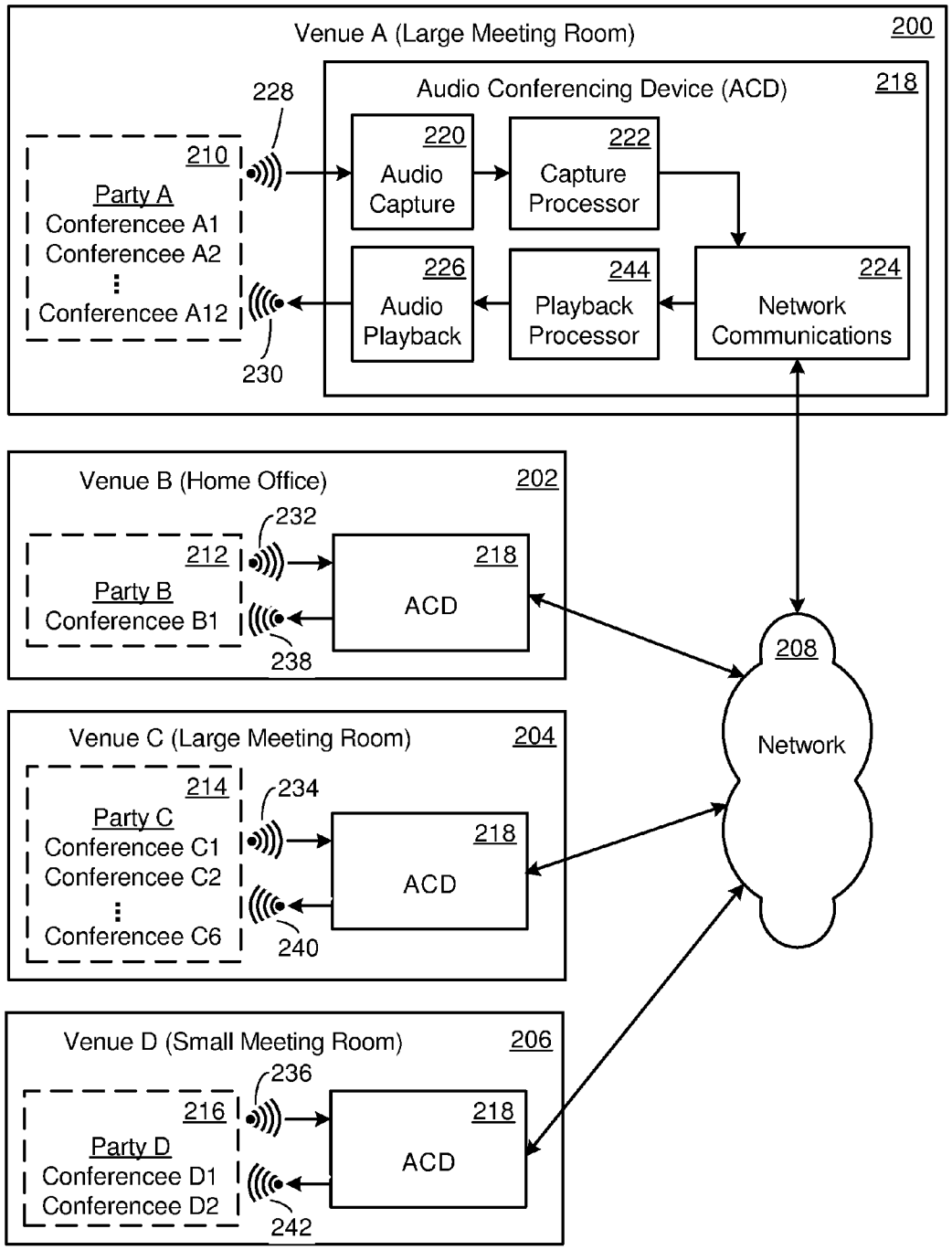
FIG. 2 illustrates a diagram of an exemplary embodiment, in simplified form, of a general architecture of a system for providing a spatial audio conference according to the present technique.

FIG. 2 illustrates a diagram of an exemplary embodiment, in simplified form, of a general architecture of a system for providing a spatial audio conference according to the present technique. This architecture applies to both the aforementioned VSP and SFC methods for spatializing the audio in an audio conference. FIG. 2 illustrates parties 210/212/214/216 at four different venues 200/202/204/206 participating in an audio conference where the venues are remote from one another and interconnected by a network 208. The number of parties 210/212/214/216 participating in the audio conference is variable and generally depends on the collaboration needs and geographic location characteristics of the conferencees. In one embodiment of the present technique the number of participating parties could be as small as two. In another embodiment of the present technique the number of participating parties could be much larger than four. As will become apparent hereafter, the maximum number of participating parties is generally limited only by various characteristics of the particular type of communications network(s) 208 employed such as available bandwidth, end-point addressing and the like.

Referring again to FIG. 2, by way of example but not limitation, venue A 200 is a large meeting venue and party A 210 has 12 different conferencees (A1-A12). Venue B 202 is a home office and party B 212 has of a single conferences B1. Venue C 204 is also a large meeting venue and party C 214 has 6 different conferencees (C1-C6). Venue D 206 is a small meeting venue and party D 216 has two different conferencees D1/D2. The number of conferencees in each party is variable and the maximum number of conferencees in any particular party is generally limited only by the physical size of the particular venue being used to house the party during the audio conference. As will be described hereafter, the conferencees in each party do not have to be located in any particular spot within the venue and do not have to remain stationary during the audio conference. In other words, the present technique allows the conferencees in each party to freely roam about the venue during the audio conference.

Referring again to FIG. 2, each particular venue 200/202/204/206 has an audio conferencing device (ACD) 218 which is responsible for concurrently performing a number of different operations. Using venue A 200 as an example, these operations generally include, but are not limited to, the following: (a) an audio capture module 220 uses an audio input device (not illustrated) to capture spatial audio information from a captured sound-field 228 emanating from the party 210 at the venue; (b) a capture processor module 222 processes the captured spatial audio information as necessary, based on the particular audio spatialization method being employed, to generate one or more audio data streams (not illustrated); (c) a network communications module 224 transmits the one or more audio data streams over the network 208 to each remote party 212/214/216; (d) the network communications module 224 also receives one or more audio data streams (not illustrated) over the network 208 from each remote party 212/214/216, where each received stream(s) includes spatial audio information that was captured from the sound-field 232/234/236 emanating from the remote party; (e) a playback processor module 244 processes these various received audio data streams as necessary, based on the particular audio spatialization method being employed, to generate a plurality of different audio signals (not illustrated); and (f) an audio playback module 226 uses an audio output device (not illustrated) to render the audio signals into a spatial audio playback sound-field 230 that is audibly perceived by the party 210, where this playback sound-field includes all the various spatial audio information that was captured from the remote parties 212/214/216.

In an alternate embodiment of the present technique, a multipoint conferencing unit or multipoint control unit (not shown) (MCU) is used to connect the ACD 218 to the network 208. In this alternate embodiment, the network communications module 224 transmits one or more audio data streams to the MCU, which in turn transmits the streams over the network 208 to each remote party. The MCU also receives one or more audio data streams over the network 208 from each remote party, and in turn transmits the received streams to the network communications module 224.

Referring again to FIG. 2, the audio capture module 220 can generally employ different types of audio input devices in order to capture the aforementioned spatial audio information from the captured sound-field 228/232/234/236. Additionally, different types of audio input devices can be employed at the different venues 200/202/204/206. Exemplary audio input devices have been described heretofore and will be further described hereafter in particular relation to the aforementioned VSP and SFC methods for spatializing the audio in an audio conference. Furthermore, different types of networks and related communication media can be employed in the network 208 and related network communications module 224. Exemplary types of networks and related communication media have been described heretofore. Additionally, the network 208 and related network communications module 224 can include a plurality of different types of networks and related communication media in the system, where the different types of networks and media are interconnected such that information flows between them as necessary to complete transmissions over the network 208.

Referring again to FIG. 2, in one embodiment of the present technique the aforementioned playback processor module's 244 processing of the various received audio data streams is performed using a conventional, computer-based, audio processing application programming interface (API), of which several are available. In tested embodiments of the present technique Microsoft's DirectSound® (a registered trademark of Microsoft Corporation) API was employed. However, any other suitable API could also be employed. As will be described in more detail hereafter, the audio playback module 226 can generally employ different types and configurations of audio output devices in order to generate the spatial audio playback sound-field 230/238/240/242. Additionally, the particular type and configuration of the audio output device employed at each venue 200/202/204/206 can vary.

Referring again to FIG. 2, the functionality of the various aforementioned modules in the ACD 218 is hereafter described in more detail as necessary for both the aforementioned VSP and SFC methods for spatializing the audio in an audio conference. Except as otherwise described herein, the ACDs 218 at each of the venues 200/202/204/206 operate in a generally similar fashion.

Referring again to FIG. 2, it is noted that the embodiments of the present technique described herein include ACDs 218 which generally capture 220/222 audio information and transmit 224 the captured audio information, as well as receive 224 audio information and playback 244/226 the received audio information. However, it should also be noted that other embodiments (not illustrated) of the present technique are also possible that include ACDs 218 which generally receive 224 audio information and playback 244/226 the received audio information, but do not capture or transmit any audio information. Such ACDs could be used by a party that is simply monitoring an audio conference.

2.3 Virtual Sound-Source Positioning (VSP)

This section describes exemplary embodiments of the VSP method for spatializing the audio in an audio conference (hereafter simply referred to as the VSP method) according to the present technique. FIG. 2 illustrates an exemplary embodiment of a general architecture of an audio conferencing system according to the present technique. This system architecture, along with the general operations that are concurrently performed by the ACD 218 at each venue 200/202/204/206, are described in the General Architecture section heretofore. The ACD's 218 operations will now be described in further detail as necessary according to the VSP method of the present technique.

2.3.1 VSP Audio Capture and Network Transmission

Referring again to FIG. 2, this section further describes aforementioned ACD 218 operations (a), (b) and (c) according to the VSP method of the present technique. Using venue A 200 as an example, the ACD's 218 capture processor module 222 generates a single (i.e. monaural) audio data stream that includes all the spatial audio information captured from the sound-field 228 emanating from the various conferencees A1-A12 in party A 210. More particularly, as exemplified in FIGS. 3A-3C, this audio data stream 308/310/312 includes monaural audio data 302 and a related captured sound-source identification (ID) metadata header 300 that is appended to the monaural audio data by the capture processor module 222. The captured sound-source ID metadata describes various attributes of the monaural audio data as will be described hereafter. The network communications module 224 transmits this single audio data stream 308/310/312 over the network 208 to each remote party 212/214/216.

As exemplified in FIG. 3A and referring again to FIG. 2, in one embodiment of the present technique the metadata 300 includes a prescribed bit-length venue ID field 304 which specifies the particular venue 200/202/204/206 the monaural audio data 302 is emanating from. As exemplified in FIG. 3B, in another embodiment the metadata 300 includes a prescribed bit-length direction ID field 306 which, among other things, specifies a particular direction, within the captured sound-field 228/232/234/236 emanating from the venue's party 210/212/214/216, that the monaural audio data 302 is principally emanating from at each point in time. As will be described in detail hereafter, the direction ID field 306 serves the function of allowing remote venues which receive the monaural audio data 302 to render a playback sound-field 230/238/240/242 containing spatial audio information that simulates the captured sound-field 228/232/234/236 emanating from a remote venue. As exemplified in FIG. 3C, in yet another embodiment the metadata 300 includes both the aforementioned venue ID field 304 and direction ID field 306. The particular bit-length chosen for the venue ID field 304 is variable and is generally based on an expected maximum number of different venues to be supported during an audio conference. The particular bit-length chosen for the direction ID field 306 is also variable and is principally based on an expected maximum number of conferencees in a party to be supported during an audio conference. In determining the bit-length of the direction ID field, consideration should also be given to factors such as the processing power of the particular ACDs 218 employed in the system and the bandwidth available in the network 208, among others. In tested embodiments of the present technique a bit-length of four bits was employed for both the venue ID field 304 and direction ID field 306, which thus provided for a system in which up to 16 different venues and up to 16 different directions per venue can be specified.

Figure 9:
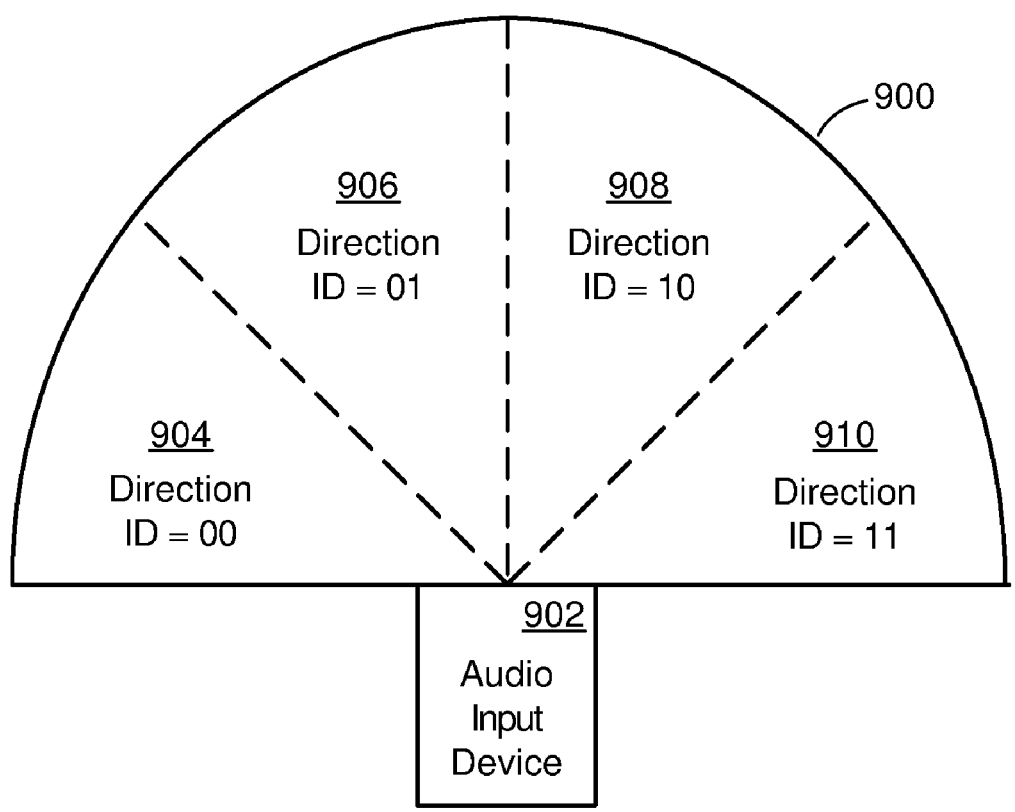
FIG. 9 illustrates a diagram of an exemplary embodiment of a captured sound-field in a system where the direction ID field has a bit-length of two bits according to the VSP method of the present technique.

FIG. 9 illustrates a diagram of an exemplary embodiment of a captured sound-field 900 and audio input device 902 used to capture the sound-field in a system where the direction ID field has a bit-length of two bits. In this illustration a direction ID=00 binary specifies that the monaural audio data is principally emanating from the left 904 portion of the captured sound-field 900 at a given point in time. A direction ID=01 binary specifies that the monaural audio data is principally emanating from the left-center 906 portion of the captured sound-field 900 at a given point in time. A direction ID=10 binary specifies that the monaural audio data is principally emanating from the right-center 908 portion of the captured sound-field 900 at a given point in time. Finally, a direction ID=11 binary specifies that the monaural audio data is principally emanating from the right 910 portion of the captured sound-field 900 at a given point in time.

Referring again to FIG. 2, for particular venues that have only a single conferencee in the party such as venue B 202, there is generally no useful direction information to be generated from the captured sound-field 232 emanating from the party 212 since there is only one possible talker at the venue. Therefore, at such particular venues 202 it generally suffices to employ a single conventional microphone (not illustrated) as the audio input device in the ACD's 218 audio capture module 220 in order to capture audio from the sound-field 232 emanating from the party 212 in the form of a single audio signal (not illustrated).

Referring again to FIGS. 2, 3B and 3C, for particular venues that have a plurality of conferencees in the party such as venues A 200, C 204 and D 206, useful direction information generally does exist in the captured sound-field 228/234/236 emanating from the party 210/214/216. At such particular venues 200/204/206, different methods can be employed to generate the information in the direction ID field 306. In one embodiment of the present technique an array of two or more directional microphones (not illustrated) is employed as the audio input device in the ACD's 218 audio capture module 220 in order to capture audio from the sound-field 228/234/236 in the form of two or more different audio signals (not illustrated). Appropriate captured sound-source location methods are then used to process 222 the two or more different audio signals in order to calculate the particular location within the captured sound-field 228/234/236 that the audio (such as the conferences in the party 210/214/216 that is currently talking) is principally emanating from at each point in time and generate the corresponding direction ID 306. Appropriate methods are also used to process 222 the different audio signals in order to translate them into the monaural audio data 302.

Referring again to FIGS. 2, 3B and 3C, in another embodiment of the present technique a computer vision sub-system (not illustrated) is employed as the audio input device in the ACD's 218 audio capture module 220. The vision sub-system includes a video camera with an integrated microphone. The video camera tracks where the audio within the captured sound-field 228/234/236 (such as the conferences in the party 210/214/216 that is currently talking) is principally emanating from at each point in time. The integrated microphone correspondingly captures this audio in the form of an audio signal (not illustrated). The processor module 222 then uses the video camera's current position information to calculate the direction ID 306 which specifies the direction within the captured sound-field 228/234/236 that the primary source of audio is emanating from at each point in time. The audio signal is also processed 222 using appropriate methods in order to translate it into the monaural audio data 302.

Referring again to FIGS. 2, 3B and 3C, whenever the aforementioned array of directional microphones or video camera is located close to the party 210/214/216 such that the audio signal(s) are captured from a near-field region of the captured sound-field 228/234/236, this information is additionally included in the direction ID field 306.

Figure 10A:
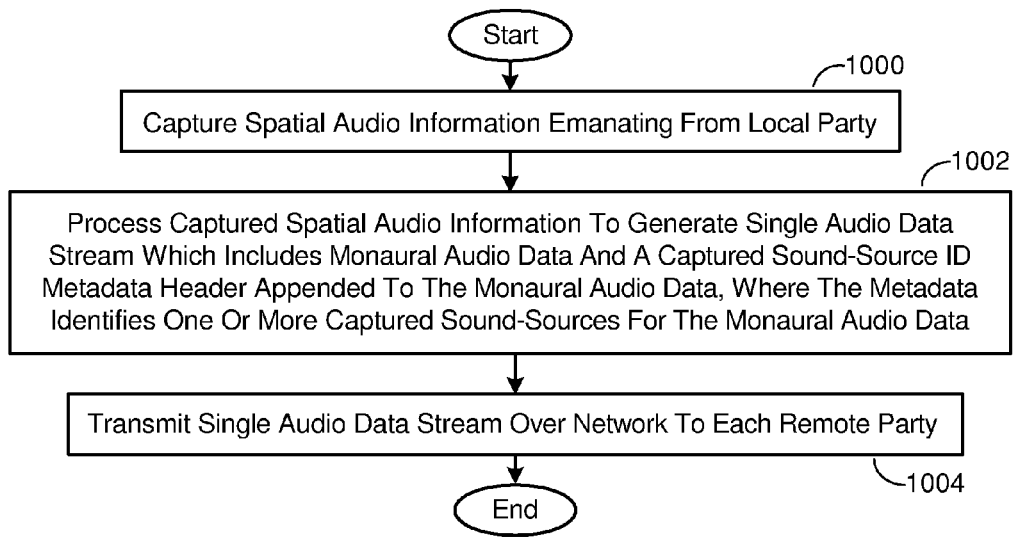
FIGS. 10A and 10B illustrate an exemplary embodiment of a process for providing a spatial audio conference according to the VSP method of the present technique.

FIG. 10A illustrates an exemplary embodiment of a process for performing the audio capture and network transmission operations associated with providing a spatial audio conference between a local party and one or more remote parties according to the VSP method of the present technique. The process starts with capturing spatial audio information emanating from the local party 1000. The captured spatial audio information is then processed in order to generate a single audio data stream which includes monaural audio data and a captured sound-source ID metadata header that is appended to the monaural audio data, where the metadata identifies one or more captured sound sources for the monaural audio data 1002. The single audio data stream is then transmitted over the network to each remote party 1004.

2.3.2 VSP Network Reception and Audio Rendering

Referring again to FIGS. 2 and 3A-3C, this section further describes aforementioned ACD 218 operations (d), (e) and (f) according to the VSP method of the present technique. Using venue A 200 as an example, the network communications module 224 receives the single audio data stream 308/310/312 transmitted from each remote party 212/214/216 over the network. The playback processor module 244 subsequently processes the monaural audio data 302 and appended captured sound-source ID metadata 300 included within each received stream 308/310/312 in order to render a spatial audio playback sound-field 230 through the audio playback module 226 and its audio output device (not illustrated), where the spatial audio playback sound-field includes all the spatial audio information received from each remote party 212/214/216 in a spatial audio format. As will become apparent from the description that follows, these audio rendering operations are not intended to faithfully reproduce the captured sound-fields 232/234/236 emanating from the party at each remote venue. Rather, these audio rendering operations generate a playback sound-field 230 that provides the venue's party 210 with the perception that different sounds emanate from a plurality of different reproduced sound-sources in the playback sound-field, thus providing the party with a spatial cue for each different sound.

Referring again to FIGS. 2 and 3A-3C, in one embodiment of the present technique stereo headphones (not illustrated) can be employed as the audio output device in the audio playback module 226 at a particular venue 200/202/204/206, where the headphones include a pair of integrated loudspeakers which are disposed onto the ears of each conferences in the particular party 210/212/214/216. In this case the playback processor module 244 generates a left-channel audio signal (not illustrated) and a right-channel audio signal (not illustrated) which are connected to the headphones. The headphones audibly render the left-channel signal into the left ear and the right-channel signal into the right ear of each conferencee. The processor 244 employs an appropriate headphone sound-field virtualization method, such as the headphone virtualization function provided in the Microsoft Windows Vista® (a registered trademark of Microsoft Corporation) operating system, to generate the two playback audio signals such that each conferencee perceives a spatial audio playback sound-field (not illustrated) emanating from the headphones, where the different captured sound-sources 300 identified for the monaural audio data 302 in each received audio data stream 308/310/312 are perceived to emanate from different locations within the playback sound-field.

Referring again to FIG. 2, in another embodiment of the present technique a stereo pair of stand-alone loudspeakers (not illustrated) can be employed as the audio output device in the audio playback module 226 at a particular venue 200/202/204/206. The pair of stand-alone loudspeakers are disposed in front of the party 210/212/214/216, where one loudspeaker is disposed on the left side of the venue and the other loudspeaker is symmetrically disposed on the right side of the venue.

Referring again to FIG. 2, in yet another embodiment of the present technique a surround-sound speaker system (not illustrated) including three or more stand-alone loudspeakers can be employed as the audio output device in the audio playback module 226 at a particular venue 200/202/204/206. The three or more stand-alone loudspeakers can be disposed in front of the party 210/212/214/216 such that one loudspeaker is disposed on the left side of the venue, another loudspeaker is symmetrically disposed on the right side of the venue, and the remaining loudspeaker(s) are symmetrically disposed between the left side and right side loudspeakers. The three or more stand-alone loudspeakers can also be disposed around the party 210/212/214/216 such that two or more loudspeakers are disposed in front of the party in the manner just described, one or more loudspeakers are disposed to the left of the party, and one or more loudspeakers are symmetrically disposed to the right of the party. In addition, one or more loudspeakers could also be disposed behind the party.

Figure 4:
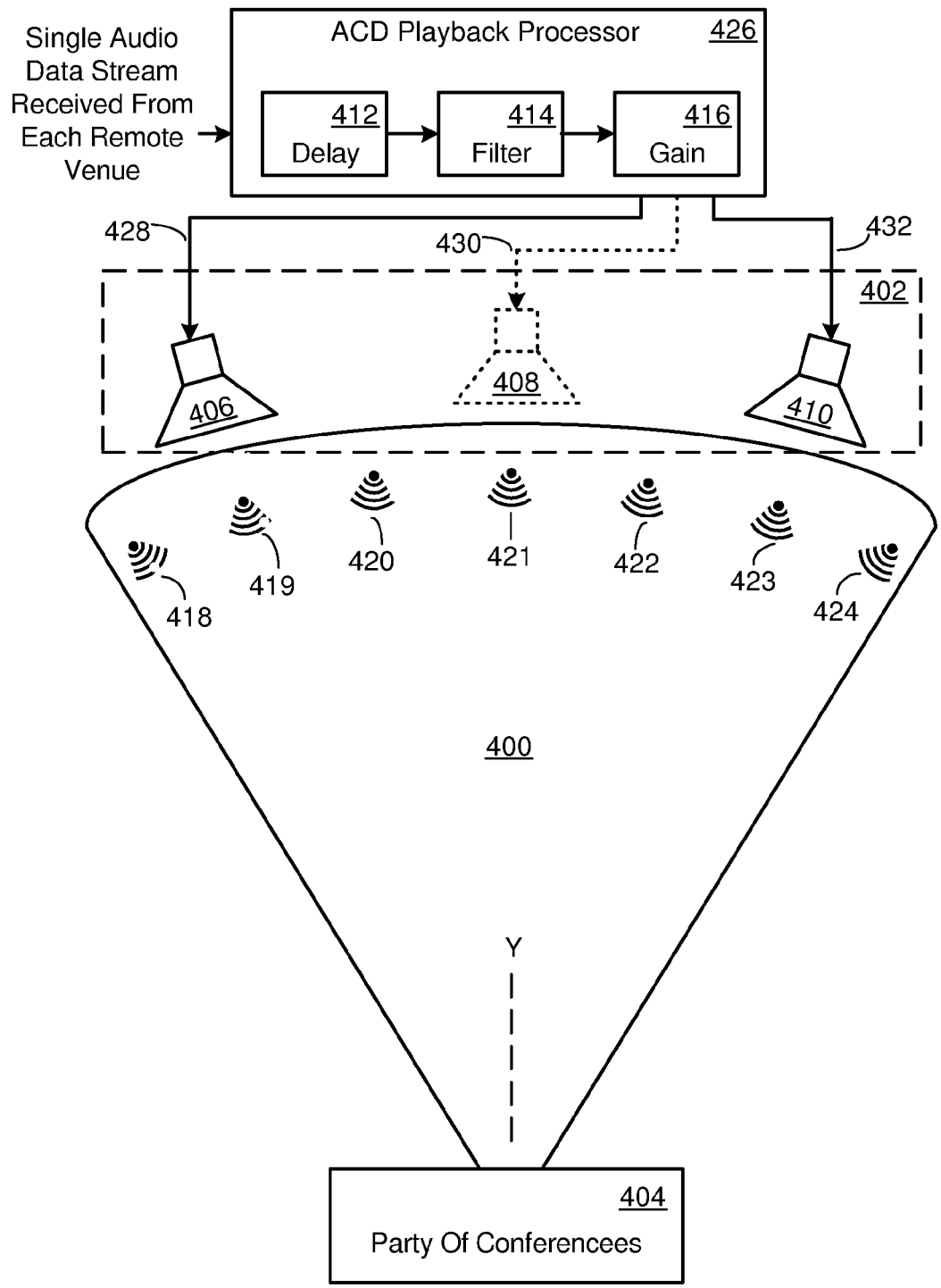
FIG. 4 illustrates a diagram of an exemplary embodiment of a rendered spatial audio sound-field emanating from an exemplary embodiment of an audio output device according to the VSP method of the present technique.

FIG. 4 illustrates a diagram of an exemplary embodiment of a rendered spatial audio playback sound-field 400 emanating from an exemplary embodiment of a stand-alone loudspeaker-based audio output device 402 according to the present technique. As described heretofore, the audio output device 402 includes a plurality of spatially disposed stand-alone loudspeakers 406/408/410. The ACD playback processor 426 generates a different playback audio signal 428/430/432 for each loudspeaker 406/408/410. Each playback audio signal 428/430/432 is connected to a particular loudspeaker 406/408/410 which audibly renders the signal. The combined rendering of all the playback audio signals 428/430/432 produces the playback sound-field 400. The loudspeakers 406/408/410 are disposed symmetrically about a horizontal axis Y centered in front of a party of one or more conferencees 404 such that the playback sound-field 400 they produce is audibly perceived by the party 404.

Figure 3A:
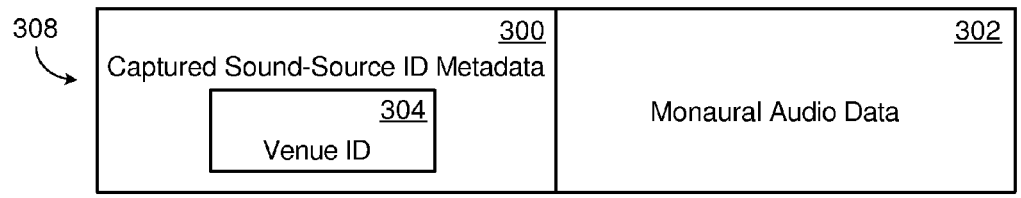
FIGS. 3A-3C illustrate diagrams of exemplary embodiments of captured sound-source identification (ID) metadata that is transmitted along with monaural audio data from each venue according to the virtual sound-source positioning (VSP) method of the present technique.
Figure 3B:
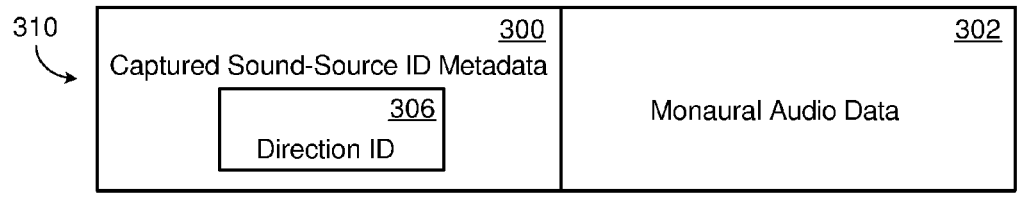
Figure 3C:
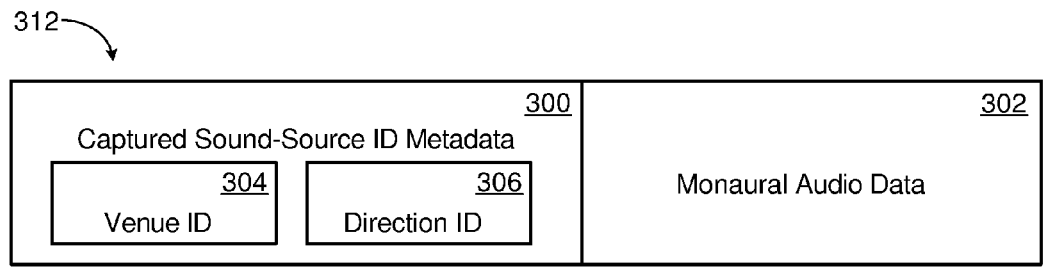

As also illustrated in FIG. 4 and referring again to FIGS. 3A-3C, in one embodiment of the present technique the ACD playback processor 426 includes a time delay stage 412, a filter stage 414 and a gain adjustment stage 416 which process the single audio data stream 308/310/312 received from each remote venue to generate the plurality of playback audio signals 428/430/432. As will be described in more detail hereafter, the different captured sound-sources 300 identified for the monaural audio data 302 in each received audio data stream 308/310/312 can be processed 426 in a manner that spatially places the different captured sound-sources within the playback sound-field 400 such that the party 404 audibly perceives the different captured sound-sources to emanate from different reproduced sound-sources 418-424 which are spatially disposed within the playback sound-field. As will also be described in more detail hereafter, these reproduced sound-sources can be disposed at various locations within the playback sound-field 400. By way of example, but not limitation, in one embodiment of the present technique in which a stereo pair of stand-alone loudspeakers (left 406 and right 410) is employed in the audio output device 402, a reproduced sound-source 419/423 can be disposed directly in front of each loudspeaker and a reproduced sound-source 421 can be disposed midway between the loudspeakers. Additionally, a reproduced sound-source can be disposed to the left 418 of the left loudspeaker 406 and to the right 424 of the right loudspeaker 410 by employing an appropriate stereo spatial enhancement processing method such as reduction to a mid-channel/side-channel (M/S) stereo signal format, followed by enhancement of the S channel, and then reconstruction of a left-channel/right-channel (L/R) stereo signal. In another embodiment of the present technique in which three stand-alone loudspeakers (left 406, center 408 and right 410) are employed in the audio output device 402, a reproduced sound-source 419/421/423 can be disposed directly in front of each loudspeaker, a reproduced sound-source 420 can be disposed midway between the left 406 and center 408 loudspeakers, a reproduced sound-source 422 can be disposed midway between the center 408 and right 410 loudspeakers, and a reproduced sound-source can be disposed to the left 418 of the left-most loudspeaker 406 and to the right 424 of the right-most loudspeaker 410 by employing the aforementioned stereo spatial enhancement processing method. In other embodiments of the present technique (not illustrated) in which more than three stand-alone loudspeakers are employed, the aforementioned methods of disposing reproduced sound-sources can be extended to generate an even larger number of different reproduced sound-sources.

Referring again to FIG. 4, seven different reproduced sound-sources 418-424, and three different stand-alone loudspeakers 406/408/410 and related playback audio signals 428/430/432, are depicted by way of example but not limitation. As noted heretofore and further described hereafter, the particular type, number and spatial location of stand-alone loudspeakers 406/408/410, and the related particular number of playback audio signals 428/430/432, employed at each venue is variable. As will be described in more detail hereafter, the particular number and spatial location of reproduced sound-sources employed at each venue is also variable.

Referring again to FIGS. 3A-3C and 4, the particular number and spatial location of different reproduced sound-sources 418-424 employed in the playback sound-field 400 rendered at each venue, and the related particular characteristics of the ACD playback processing 426 performed at each venue in the time delay stage 412, filter stage 414 and gain adjustment stage 416 are prescribed based on various system attributes including but not limited to the following: (a) whether or not the captured sound-source ID metadata 300 employs a venue ID field 304 and if so, the number of bits employed in this field; (b) whether or not the captured sound-source ID metadata 300 employs a direction ID field 306 and if so, the number of bits employed in this field; (c) whether or not the captured sound-source ID metadata 300 employs both a venue ID field 304 and direction ID field 306; (d) the total number of remote parties participating in a particular audio conference; (e) the type of audio output device 402 employed at the venue; and (f) the particular number and configuration of stand-alone loudspeakers employed in the audio output device 402.

Referring again to FIGS. 3A-3C and 4, regardless of the particular configuration of reproduced sound-sources 418-424 employed in the playback sound-field 400 rendered at a particular venue, and regardless of the total number of different captured sound-sources identified 300 in the information received from the remote venues, the following guidelines should be followed. The mapping of which particular identified captured sound-sources 300 are assigned to which particular reproduced sound-sources 418-424 should not change during an audio conference in order to maintain spatial continuity (i.e. sound-source "stationarity") and not confuse the listening party 404. If the direction ID field 306 is employed in the system, regardless of which of the aforementioned methods is employed at each venue to generate the information in this field 306, whenever the direction ID field specifies more than two captured sound-sources for particular monaural audio data, the mapping of these captured sound-sources to particular reproduced sound-sources 418-424 should be implemented in a manner that results in equal separation between each of the captured sound-sources. This is desirable for the following reason. If the party 404 has a plurality of conferencees sitting around a table (as is typical for any reasonable size party), and if the aforementioned array of directional microphones or video camera is located at one end of the table, the angle between the microphones/camera and two adjacent conferencees sitting farthest from the microphones/camera is much smaller than the angle between the microphones/camera and two adjacent conferencees sitting closest to the microphones/camera.

Referring again to FIGS. 3B, 3C and 4, as described heretofore, the direction ID field 306 can include information as to if the monaural audio data 302 received from a particular remote venue was captured from a near-field region of the captured sound-field or not. Whenever the direction ID field 306 is employed in the system, and whenever this field indicates that the monaural audio data 302 was captured from a near-field region of the captured sound-field at a particular remote venue, in one embodiment of the present technique the ACD playback processor 426 can use an appropriate method such as standard panpots to calculate prescribed time delay (optional) 412 and gain (required) 416 adjustments for the monaural audio data 302 received from the particular remote venue in order to simulate the captured sound-field at the particular remote venue. These adjustments are applied as follows to each captured sound-source 300 identified for the monaural audio data 302 received from the remote venue as the captured sound-source is reproduced and played back through the audio output device 402 in the manner described herein. A non-adjusted version of the captured sound-source 300 is mapped to one particular reproduced sound-source 418-424 in the playback sound-field 400. The time delay 412 and gain 416 adjusted version of the captured sound-source is commonly mapped to at least three other reproduced sound-sources in the playback sound-field. This results in the listening party 404 being able to accurately audibly perceive the intended location of the captured sound-source 300 within the playback sound-field 400 for the following reason. As is understood by those skilled in the art, the human auditory system exhibits a phenomena known as the "Hass effect" (or more generally known as the "precedence effect") in which early arrival of a sound at a listener's two ears substantially suppresses the listener's ability to audibly perceive later arrivals of the same sound. As such, the non-adjusted version of the captured sound-source 300 serves the function of an early audio signal which masks the listening party's 404 perception of later arrivals of the same audio signal due to venue reflections of the captured sound-source.

Referring again to FIGS. 3A-3C and 4, in one embodiment of the present technique the filter stage 414 can analyze certain voice properties, such as pitch, of the received monaural audio data 302 and this analysis can be used to map different identified captured sound-sources 300 with similar voice properties to reproduced sound-sources that are far apart in the playback sound-field 400 in order to optimize the listening party's 404 ability to identify who is talking at the remote venues. In another embodiment of the present technique the filter stage 414 is implemented using an actual head-related transfer function (HRTF) measurement for a prototypical conferences, thus enhancing the accuracy of the party's 404 perception of the reproduced sound-sources 418-424 employed in the playback sound-field 400, and in general enhancing the overall spatial effect audibly perceived by the party. Having a plurality of audio channels 406/408/410 in the audio output device 402 allows some reproduction of the de-correlation of the sound due to venue reverberation that is captured at each venue. This results in each remote conferencee perceiving the sound as if they were physically present in the venue that the sound was originally captured in.

Referring again to FIGS. 3A-3C and 4, the following is a description of exemplary embodiments of different reproduced sound-source 418-424 configurations and related mappings of identified captured sound-sources 300 to reproduced sound-sources that can be employed in the playback sound-field 400 according to the present technique. This description covers only a very small portion of the many embodiments that could be employed. In a simple situation A in which three different venues are participating in an audio conference, and the audio conferencing system employs only the venue ID field 304 in the captured sound-source ID metadata 300, and at a particular venue a stereo pair of stand-alone loudspeakers 406/410 is employed as the audio output device 402, the monaural audio data 302 received from one remote venue could be routed 426 directly to the left loudspeaker 406 (i.e. mapped to reproduced sound-source 419) and the monaural audio data 302 received from the second remote venue could be routed 426 directly to the right loudspeaker 410 (i.e. mapped to reproduced sound-source 423). If this situation A is modified such that four different venues are participating in the audio conference, resulting in situation B, the monaural audio data 302 received from the third remote venue could be mapped to reproduced sound-source 421, located midway between the left 406 and right 410 loudspeakers, by processing 426 this audio data as follows. A pair of differentially delayed, partial-amplitude playback audio signals 428/432 can be generated such that one partial-amplitude delayed signal 428 is audibly rendered by the left loudspeaker 406 and the other partial-amplitude differentially delayed signal 432 is audibly rendered by the right loudspeaker 410, thus resulting in the party's 404 perception that this audio data 302 emanates from reproduced sound-source 421.

Referring again to FIGS. 3A-3C and 4, if aforementioned situation B is modified such that a third, center stand-alone loudspeaker 408 is added, resulting in situation C, then the monaural audio data 302 received from the third remote venue could be routed 426 directly to the center loudspeaker 408 (i.e. mapped to reproduced sound-source 421). If this situation C is modified such that six different venues are participating in the audio conference, resulting in situation D, the monaural audio data 302 received from the fourth remote venue could be mapped to reproduced sound-source 420, located midway between the left 406 and center 408 loudspeakers, by processing 426 this audio data as follows. A pair of differentially delayed, partial-amplitude playback audio signals 428/430 can be generated such that one partial-amplitude delayed signal 428 is audibly rendered by the left loudspeaker 406 and the other partial-amplitude differentially delayed signal 430 is audibly rendered by the center loudspeaker 408, thus resulting in the party's 404 perception that this audio data 302 emanates from reproduced sound-source 420. Additionally, the monaural audio data 302 received from the fifth remote venue could be mapped to reproduced sound-source 422, located midway between the center 408 and right 410 loudspeakers, by processing 426 this audio data as follows. A pair of differentially delayed, partial-amplitude playback audio signals 430/432 can be generated such that one partial-amplitude delayed signal 430 is audibly rendered by the center loudspeaker 408 and the other partial-amplitude differently delayed signal 432 is audibly rendered by the right loudspeaker 410, thus resulting in the party's 404 perception that this audio data 302 emanates from reproduced sound-source 422.

Referring again to FIGS. 3B, 3C and 4, the aforementioned exemplary mappings of received identified captured sound-sources 300 to reproduced sound-sources in the playback sound-field 400 at each venue are similarly applicable to situations in which the audio conferencing system employs only the direction ID field 306 in the captured sound-source ID metadata 300, or situations in which the system employs both the venue ID field 304 and direction ID field 306 in the metadata 300. In particular audio conference situations where the number of different identified captured sound-sources 300 received at a particular venue is larger than the number of different reproduced sound-sources 418-424 available in the playback sound-field 400 at the venue, a plurality of captured sound-sources could be mapped to a common reproduced sound-source.

Figure 10B:
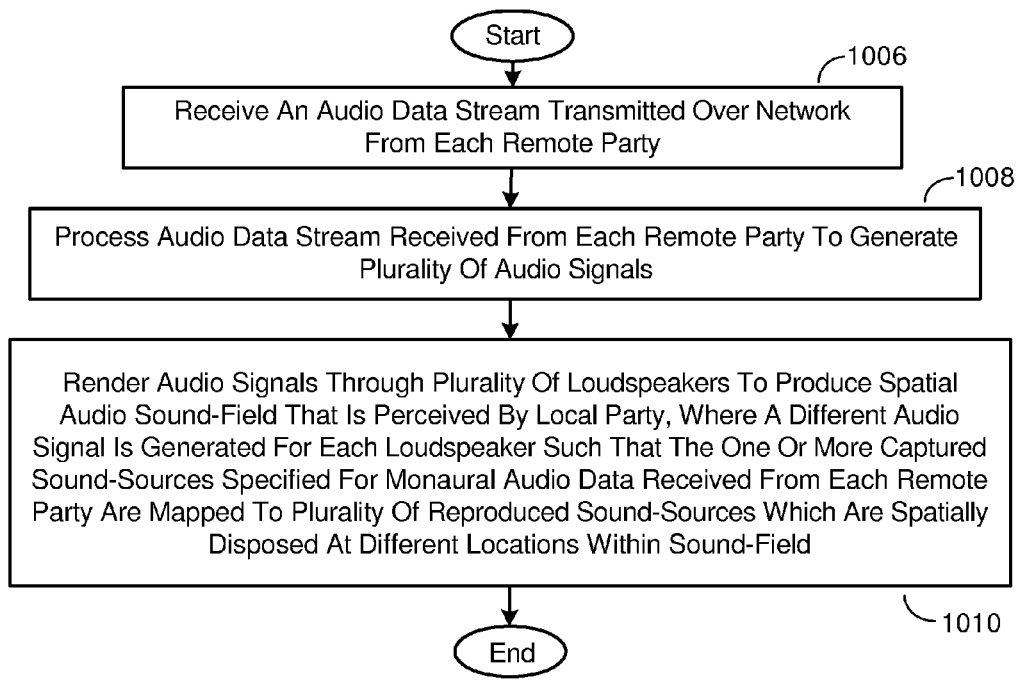

FIG. 10B illustrates an exemplary embodiment of a process for performing the network reception and audio rendering operations associated with providing a spatial audio conference between a local party and one or more remote parties according to the VSP method of the present technique. The process starts with receiving an audio data stream transmitted over the network from each remote party 1006. The audio data stream received from each remote party is then processed in order to generate a plurality of audio signals 1008. The audio signals are then rendered through a plurality of loudspeakers in order to produce a spatial audio sound-field that is audibly perceived by the local party, where a different audio signal is generated for each loudspeaker such that the one or more captured sound-sources specified for the monaural audio data received from each remote party are mapped to a plurality of reproduced sound-sources which are spatially disposed at different locations within the sound-field 1010.

2.4 Sound-Field Capture (SFC)

This section describes exemplary embodiments of the SFC method for spatializing the audio in an audio conference (hereafter simply referred to as the SFC method) according to the present technique. FIG. 2 illustrates an exemplary embodiment of a general architecture of an audio conferencing system according to the present technique. This system architecture, along with the general operations that are concurrently performed by the ACD 218 at each venue 200/202/204/206, are described in the General Architecture section heretofore. The ACD's 218 operations will now be described in further detail as necessary according to the SFC method of the present technique.

2.4.1 SFC Audio Capture and Network Transmission

Referring again to FIG. 2, this section further describes aforementioned ACD 218 operations (a), (b) and (c) according to the SFC method of the present technique. In general contrast to the VSP method for spatializing the audio in an audio conference which employs the transmission of a single (i.e. monaural) audio data stream between venues over the network 208, the SFC method employs the transmission of one or more different audio data streams between venues. Using venue A 200 as an example, the ACD's 218 capture processor module 222 generates a prescribed number N of different audio data streams that represent the captured sound-field 228 emanating from the various conferencees A1-A12 in the party 210. More particularly, as exemplified in FIG. 5, each of these N different audio data streams 508 includes an audio data channel 502 and a related captured sound-source identification (ID) metadata header 500 that is appended to the audio data channel by the processor module 222, where the captured sound-source ID metadata describes various attributes of the audio data contained within the audio data channel. As will be described in more detail hereafter, the particular number N of different audio data streams 508 employed at, and transmitted from, each venue is prescribed independently for each venue, where N is equal to or greater than one. The network communications module 224 transmits the N different audio data streams 508 to each remote venue 202/204/206.

As exemplified in FIG. 5 and referring again to FIG. 2, in one embodiment of the present technique the metadata 500 includes the following two fields. A prescribed bit-length venue ID field 504 specifies the particular venue 200/202/204/206 the audio data channel N 502 is emanating from. As will be described in more detail hereafter, a prescribed bit-length channel ID field 506 specifies attributes of the particular microphone in the audio capture module 220 that was used to capture the audio signal related to audio data channel N 502. The particular bit lengths chosen for the venue ID field 504 and channel ID field 506 are variable and are generally based on a variety of different attributes of the audio conferencing system such as an expected maximum number of different venues to be supported during an audio conference, an expected maximum number of microphones to be used in the audio capture module 220 and a related expected maximum number of different audio data streams 508 to be transmitted from a venue, the processing power of the particular ACDs 218 employed in the system, and the bandwidth available in the network 208, among others. In tested embodiments of the present technique a bit-length of four bits was employed for the venue ID field 504 and a bit-length of two bits was employed for the channel ID field 506, which thus supported the ID of up to 16 different venues and up to four different audio data channels 502 per venue.

Referring again to FIGS. 2 and 5, for particular venues that have only a single conferencee in the party such as venue B 202, since there is only one possible talker at the venue, in one embodiment of the present technique it can suffice to employ a single conventional microphone (not illustrated) as the audio input device in the ACD's 218 audio capture module 220 in order to capture a single audio signal from the captured sound-field 232 emanating from the party 212. In this case the ACD's 218 capture processor module 222 generates only a single audio data channel 502 and puts information into the channel ID field 506 for the channel that specifies this is the only channel that was captured from the sound-field 232 emanating from party B 212. Accordingly, the network communications module 224 transmits only one audio data stream 508 to each remote venue 200/204/206. In an alternate embodiment of the present technique, assuming the ACD 218 has sufficient processing power and the network 208 has sufficient bandwidth, a sound-field capture microphone array (not illustrated) can be employed as the audio input device. This microphone array, which will be described in detail hereafter, generally includes three or more microphones which capture three or more different audio signals from the captured sound-field 232 emanating from the party 212. In this case the ACD's 218 capture processor module 222 generates a different audio data channel 502 for each signal. The capture processor module 222 also puts information into the channel ID field 506 for each audio data channel 502 that specifies a directional orientation within the captured sound-field 232 for the particular microphone that captured the particular signal that resulted in the audio data channel. Accordingly, the network communications module 224 transmits three or more different audio data streams 508 to each remote venue.

Referring again to FIGS. 2 and 5, for particular venues that have a plurality of conferencees in the party such as venues A 200, C 204 and D 206, useful spatial audio information can exist in the captured sound-fields 228/234/236 emanating from the parties 210/214/216 since there are a plurality of possible talkers at these venues. Therefore, at such particular venues 200/204/206 the aforementioned sound-field capture microphone array can be employed as the audio input device in the audio capture module 220. As discussed heretofore, this microphone array captures three or more different audio signals from the captured sound-fields 228/234/236 emanating from the parties 210/214/216. In this case the ACD's 218 capture processor module 222 generates a different audio data channel 502 for each signal. The capture processor module 222 also puts information into the channel ID field 506 for each audio data channel 502 that specifies a directional orientation within the captured sound-field 228/234/236 for the particular microphone that captured the particular signal that resulted in the audio data channel. Accordingly, the network communications module 224 transmits three or more different audio data streams 508 to each remote venue.

Figure 5:
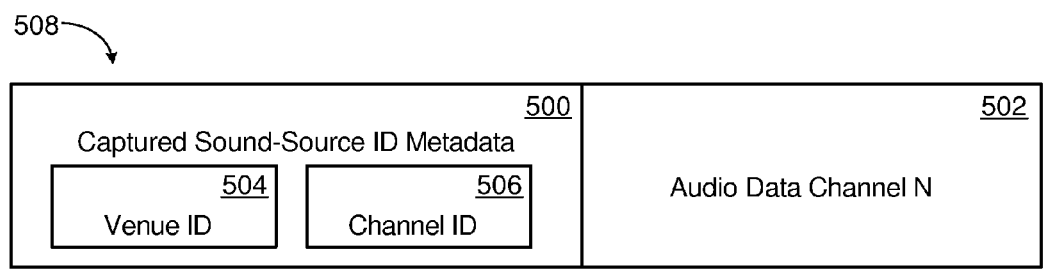
FIG. 5 illustrates a diagram of an exemplary embodiment of captured sound-source ID metadata that is transmitted along with each of N audio data channels from each venue according to the sound-field capture (SFC) method of the present technique.
Figure 6:
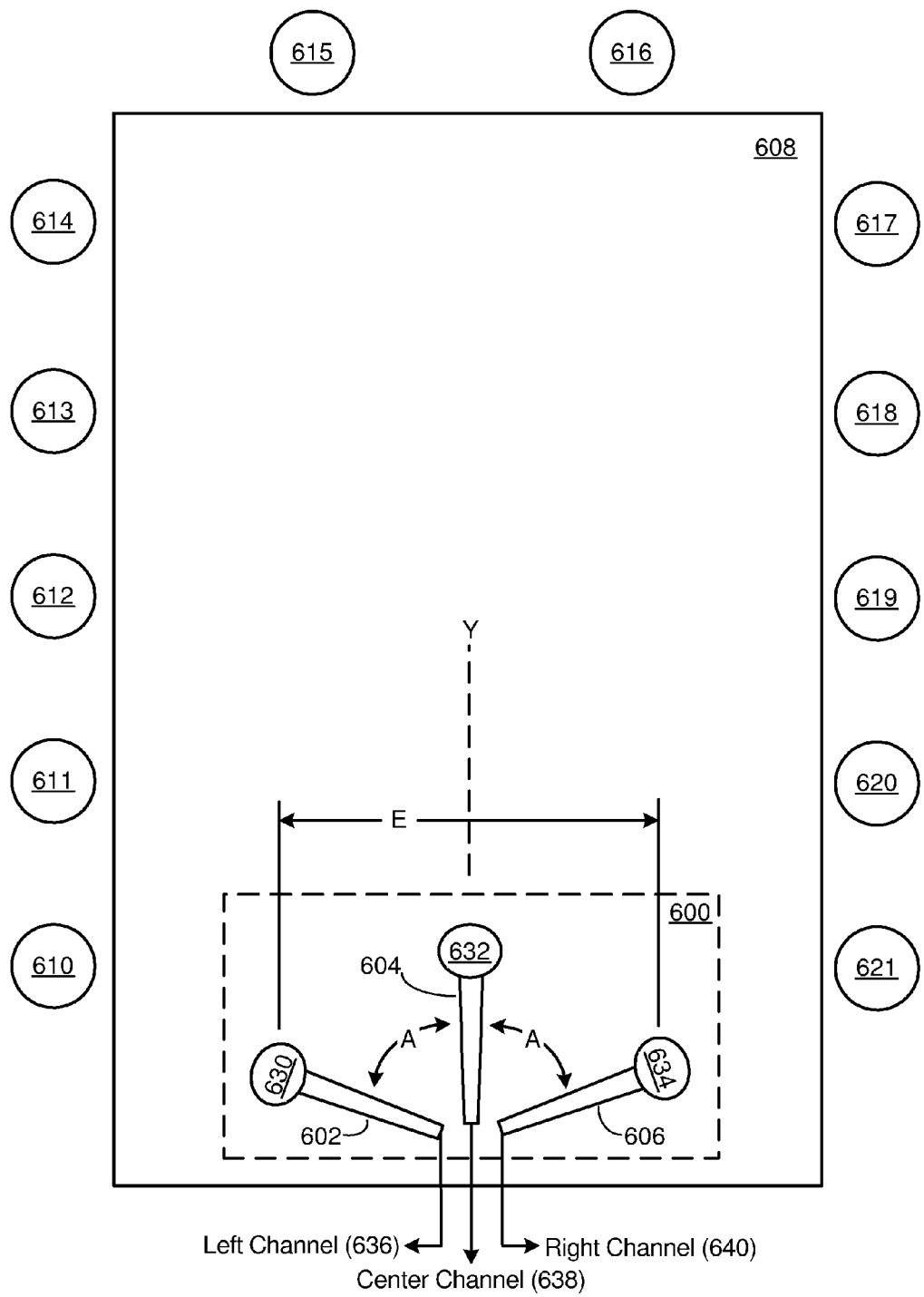
FIG. 6 illustrates a diagram of an exemplary embodiment of a sound-field capture microphone array in an exemplary capture configuration according to the SFC method of the present technique.

FIG. 6 illustrates one embodiment of the aforementioned sound-field capture microphone array 600. The microphone array 600 includes three microphones 602/604/606 which are configured in a semicircular array. Each of the microphones 602/604/606 includes a sound capture element 630/632/634 which is highly directional. The microphones 602/604/606 are disposed symmetrically about a center axis Y such that each sound capture element 630/632/634 captures sound waves from a different portion of the captured sound-field (not illustrated) which emanates from a plurality of conferencees 610-621 in a party. A center microphone 604 is disposed along the center axis Y. The other two microphones 602/606 are symmetrically disposed on either side of the center axis Y. More particularly, a left-most microphone 602 is disposed an angle A to the left of the horizontal axis Y and a right-most microphone 606 is disposed the same angle A to the right of the horizontal axis Y. Each of the sound capture elements 630/632/634 independently captures sound-waves emanating from, and generates a corresponding audio signal for, a different portion of the captured sound-field. More particularly, as illustrated in FIG. 6 and referring again to FIG. 5, the left-most capture element 630 generates a left channel captured audio signal 636 which, as described heretofore, is processed to generate a first audio data stream 508. This first audio data stream 508 includes an audio data channel 502 corresponding to the left signal along with a channel ID 506 that specifies the data 502 is for a left channel (e.g. channel ID=00 binary). The center capture element 632 generates a center channel captured audio signal 638 which is processed to generate a second audio data stream 508. This second audio data stream 508 includes an audio data channel 502 corresponding to the center signal along with a channel ID 506 that specifies the data 502 is for a center channel (e.g. channel ID=01 binary). The right-most capture element 634 generates a right channel captured audio signal 640 which is processed to generate a third audio data stream 508. This third audio data stream 508 includes an audio data channel 502 corresponding to the right signal along with a channel ID 506 that specifies the data 502 is for a right channel (e.g. channel ID=10 binary).

Referring again to FIG. 6, the value of angle A is prescribed such that the distance E between the left-most capture element 630 and right-most capture element 634 approximates the time delay between the ears on a typical adult human head. This fact, combined with the aforementioned fact that the sound capture elements 630/632/634 are highly directional, results in the microphone array's 600 ability to direct capture sound waves in a manner that imitates a human's inter-aural head delay while generating a set of audio signals 636/638/640 which has substantial energy in each signal at all times. Therefore, the captured audio signals 636/638/640 contain the aforementioned necessary ITD and ILD cues such that when the audio data channels containing these signals are received and rendered at the remote venues, as will be described in more detail hereafter, the party at each remote venue properly audibly perceives where each direct sound in the captured sound-field is coming from.

Referring again to FIG. 6, in tested embodiments of the present technique hypercardioid type microphones 602/604/606 were employed in the microphone array 600. The high degree of directionality associated with the hypercardioid type microphones 602/604/606 ensures the audio signal 636/638/640 generated for each different portion of the captured sound-field has a different gain "profile." Thus, the captured audio signals 636/638/640 contain both time and amplitude "panning" information which, as will also be described in more detail hereafter, further improves a remote party's perception of the playback sound-field that is rendered from these signals. The high degree of directionality associated with the hypercardioid type microphones 602/604/606 also ensures that each microphone captures a different reverberant field. Thus, when the corresponding captured audio signals 636/638/640 are rendered to produce a playback sound-field in the manner described hereafter, the different reverberant fields are de-correlated. As will also be described in more detail hereafter, this yet further improves a remote party's perception of the playback sound-field that is rendered from these signals 636/638/640.

Figure 7:
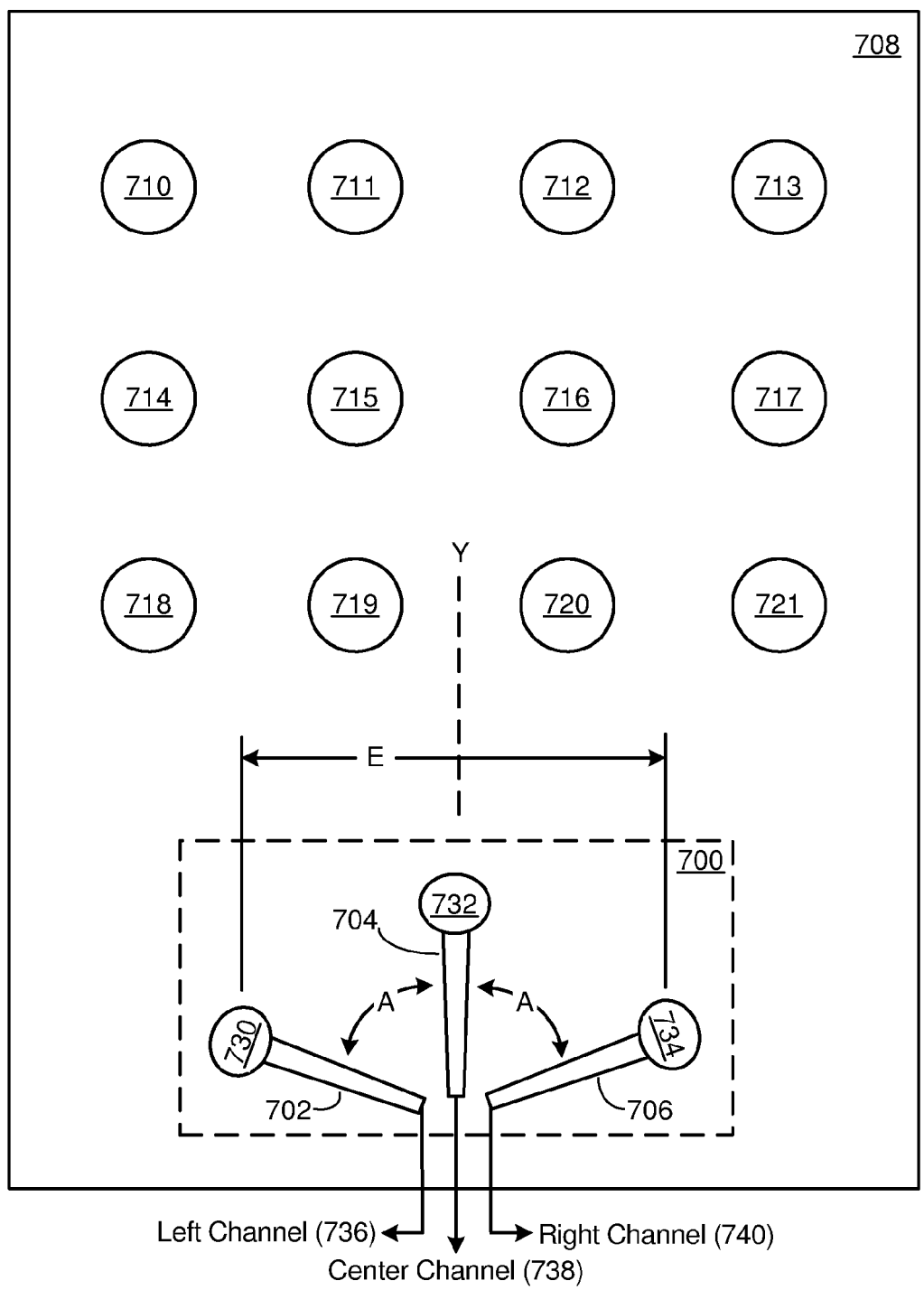
FIG. 7 illustrates a diagram of the exemplary embodiment of the sound-field capture microphone array in another exemplary capture configuration according to the SFC method of the present technique.

Referring again to FIG. 6, for each particular venue, the microphone array 600 is placed in what is commonly termed the "sweet spot" of the captured sound-field at that venue. This sweet spot is defined in terms of both a vertical height of the sound capture elements 630/632/634 and a horizontal positioning of the sound capture elements in relation to the conferencees in the party. The vertical height of the sweet spot is along the horizontal plane formed by the average height of the mouths of the conferencees 610-621 in the party. The horizontal positioning of the sweet spot is defined as follows. By way of example but not limitation, if the conferencees 610-621 at a particular venue are sitting around a table 608, the horizontal positioning of the sweet spot is located at the center of one end of the table as generally illustrated in FIG. 6. By way of further example, as generally illustrated in FIG. 7, if the conferencees 710-721 at a particular venue are not sitting around a table, but rather are disposed at various locations throughout a venue 708, the horizontal positioning of the sweet spot is located at the center of the front of the venue.

It is noted that other embodiments (not illustrated) of the sound-field capture microphone array are also possible which include more than three highly directional microphones. In these other embodiments the more than three microphones are also disposed symmetrically about a horizontal axis. Each of the more than three microphones also includes a sound capture element which is highly directional and independently captures sound-waves emanating directly from, and generates a corresponding audio signal for, a different particular direction in the captured sound-field. As such, referring again to FIG. 5, the more than three different captured audio signals would be processed as described heretofore to generate more than three different audio data streams 508, each of which includes an audio data channel 502 corresponding to a particular captured audio signal, along with a channel ID 506 that specifies which channel the data 502 is for. In the event that the microphone array includes more than four microphones, the bit-length chosen for the channel ID field 506 would accordingly need to be more than two bits.

Figure 11A:
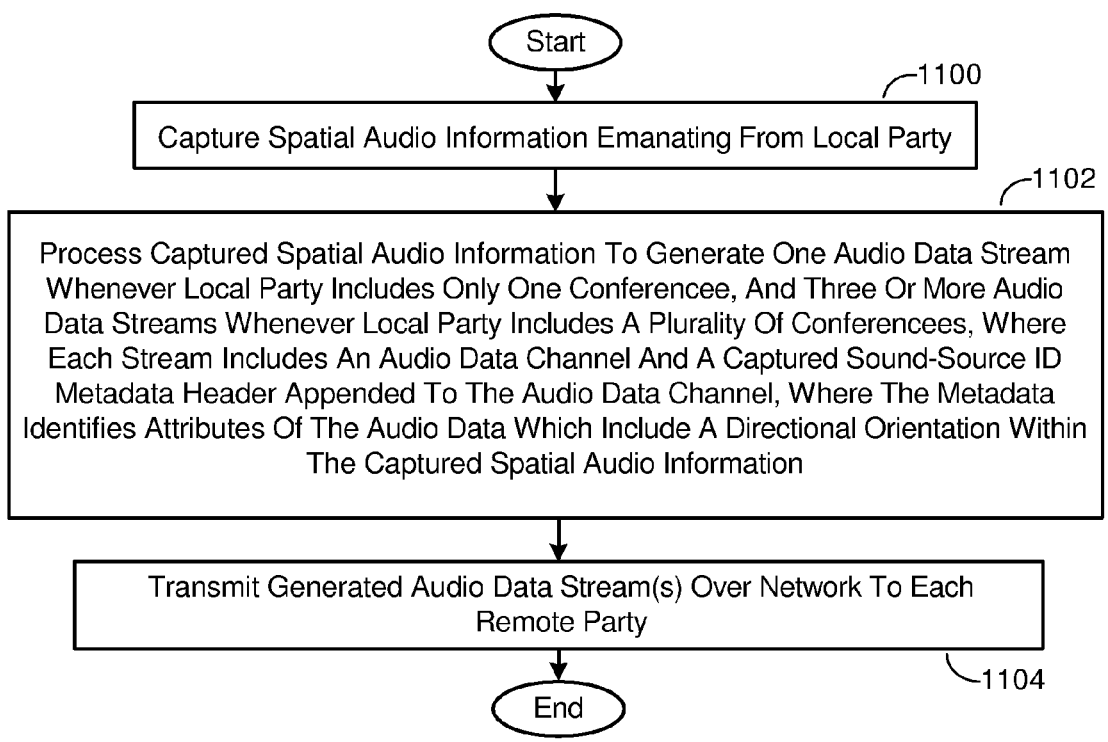
FIGS. 11A and 11B illustrate an exemplary embodiment of a process for providing a spatial audio conference according to the SFC method of the present technique

FIG. 11A illustrates an exemplary embodiment of a process for performing the audio capture and network transmission operations associated with providing a spatial audio conference between a local party and one or more remote parties according to the SFC method of the present technique. The process starts with capturing spatial audio information emanating from the local party 1100. The captured spatial audio information is then processed in order to generate one audio data stream whenever the local party includes only one conferences, and three or more audio data streams whenever the local party includes a plurality of conferencees, where each stream includes an audio data channel and a captured sound-source ID metadata header that is appended to the audio data channel, where the metadata identifies attributes of the audio data which include a directional orientation within the captured spatial audio information 1102. The generated audio data stream(s) are then transmitted over the network to each remote party 1104.

2.4.2 SFC Network Reception and Audio Rendering

Referring again to FIGS. 2 and 5, this section further describes aforementioned ACD 218 operations (d), (e) and (f) according to the SFC method of the present technique. Using venue A 200 as an example, the network communication module 224 receives the N different audio data streams 508 transmitted from each remote venue 202/204/206. The playback processor module 244 subsequently processes the audio data channel 502 and appended captured sound-source ID metadata 500 included within each received stream 508 in order to render a spatial audio playback sound-field 230 through the audio playback module 226 and its audio output device (not illustrated), where the spatial audio playback sound-field includes all the audio information received from the remote venues 202/204/206 in a spatial audio format.

Referring again to FIGS. 2 and 5, in one embodiment of the present technique stereo headphones (not illustrated) can be employed as the audio output device in the audio playback module 226 at a particular venue 200/202/204/206, where the headphones include a pair of integrated loudspeakers which are disposed onto the ears of each conferences in the particular party 210/212/214/216. In this case the playback processor module 244 generates a left-channel audio signal (not illustrated) and a right-channel audio signal (not illustrated) which are connected to the headphones. The headphones audibly render the left-channel signal into the left ear and the right-channel signal into the right ear of each conferencee. The processor 244 employs an appropriate headphone sound-field virtualization method, such as the headphone virtualization function provided in the Microsoft Windows Vista® (a registered trademark of Microsoft Corporation) operating system, to generate the two playback audio signals such that each conferencee perceives a spatial audio playback sound-field (not illustrated) emanating from the headphones, where the different audio data channels 502 in the different received audio data streams 508 are perceived to emanate from different locations within the playback sound-field.

Referring again to FIG. 2, in another embodiment of the present technique a surround-sound speaker system (not illustrated) including three or more stand-alone loudspeakers can be employed as the audio output device in the audio playback module 226 at a particular venue 200/202/204/206. The three or more stand-alone loudspeakers can be disposed in front of the party 210/212/214/216 such that one loudspeaker is disposed on the left side of the venue, another loudspeaker is symmetrically disposed on the right side of the venue, and the remaining loudspeaker(s) are symmetrically disposed between the left side and right side loudspeakers. The three or more stand-alone loudspeakers can also be disposed around the party 210/212/214/216 such that two or more loudspeakers are disposed in front of the party in the manner just described, one or more loudspeakers are disposed to the left of the party, and one or more loudspeakers are symmetrically disposed to the right of the party. In addition, one or more loudspeakers could also be disposed behind the party.

Figure 8:
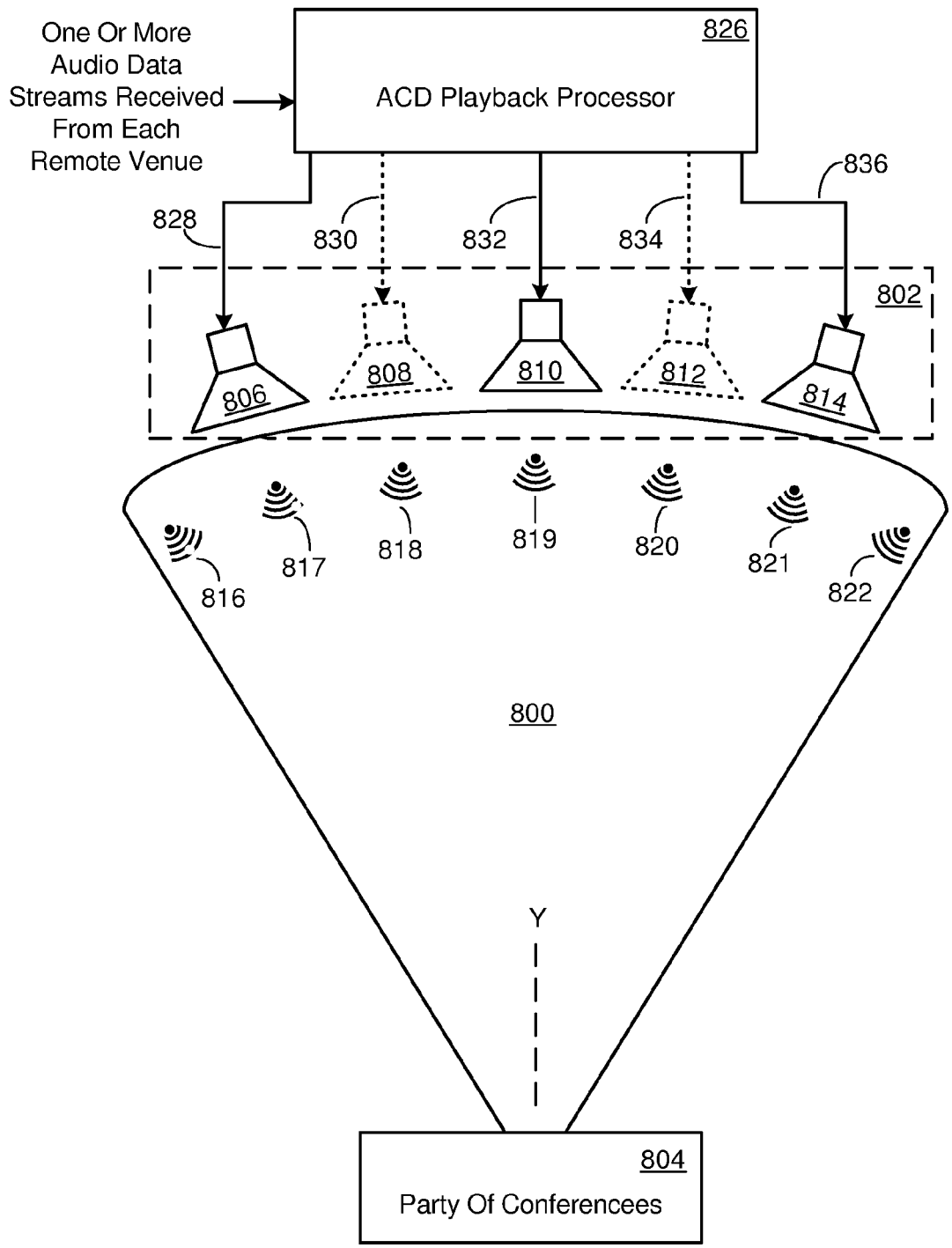
FIG. 8 illustrates a diagram of an exemplary embodiment of a rendered spatial audio sound-field emanating from an exemplary embodiment of an audio output device according to the SFC method of the present technique.

FIG. 8 illustrates a diagram of an exemplary embodiment of a rendered spatial audio playback sound-field 800 emanating from an exemplary embodiment of a stand-alone loudspeaker-based audio output device 802 according to the present technique. As described heretofore, the audio output device 802 includes three or more spatially disposed stand-alone loudspeakers 806/808/810/812/814. The ACD playback processor 826 generates a different playback audio signal 828/830/832/834/836 for each loudspeaker 806/808/810/812/814. Each playback audio signal 828/830/832/834/836 is connected to a particular loudspeaker 806/808/810/812/814 which audibly renders the signal. The combined rendering of all the playback audio signals 828/830/832/834/836 produces the playback sound-field 800. The loudspeakers 806/808/810/812/814 are disposed symmetrically about a horizontal axis Y centered in front of a party of one or more conferencees 804 such that the playback sound-field 800 they produce is audibly perceived by the party 804.

As also illustrated in FIG. 8 and referring again to FIG. 5, as described heretofore, the ACD playback processor 826 processes the one or more audio data streams 508 received from each remote venue to generate the different playback audio signals 828/830/832/834/836. As will be described in more detail hereafter, each received audio data stream 508 can be processed 826 in a manner that spatially places its audio 502 within the playback sound-field 800 such that the party 804 audibly perceives this audio 502 to emanate from a particular reproduced sound-source 816-822 which is spatially disposed within the playback sound-field. As will also be described in more detail hereafter, these reproduced sound-sources can be disposed at various locations within the playback sound-field 800. By way of example, but not limitation, in one embodiment of the present technique in which three stand-alone loudspeakers (left 806, center 810 and right 814) are employed in the audio output device 802, a reproduced sound-source 817/819/821 can be disposed directly in front of each loudspeaker, a reproduced sound-source 818 can be disposed midway between the left 806 and center 810 loudspeakers, a reproduced sound-source 820 can be disposed midway between the center 810 and right 814 loudspeakers, and a reproduced sound-source can be disposed to the left 816 of the left-most loudspeaker 806 and to the right 822 of the right-most loudspeaker 814 by employing an appropriate stereo spatial enhancement processing method such as reduction to a mid-channel/side-channel (M/S) stereo signal format, followed by enhancement of the S channel, and then reconstruction of a left-channel/right-channel (L/R) stereo signal.

In another embodiment of the present technique in which five stand-alone loudspeakers (left 806, left-center 808, center 810, right-center 812 and right 814) are employed in the audio output device 802, a reproduced sound-source 817-821 can be disposed directly in front of each loudspeaker, a reproduced sound-source (not illustrated) can be disposed midway between the left 806 and left-center 808 loudspeakers, a reproduced sound-source (not illustrated) can be disposed midway between the left-center 808 and center 810 loudspeakers, a reproduced sound-source (not illustrated) can be disposed midway between the center 810 and right-center 812 loudspeakers, a reproduced sound-source (not illustrated) can be disposed midway between the right-center 812 and right 814 loudspeakers, and a reproduced sound-source can be disposed to the left 816 of the left-most loudspeaker 806 and to the right 822 of the right-most loudspeaker 814 by employing the aforementioned stereo spatial enhancement processing method. In other embodiments of the present technique (not illustrated) in which more than five stand-alone loudspeakers are employed, the aforementioned methods of disposing reproduced sound-sources can be extended to generate an even larger number of different reproduced sound-sources.

Referring again to FIG. 8, seven different reproduced sound-sources 816-822, and three (or optionally five) different stand-alone loudspeakers 806/808/810/812/814 and related playback audio signals 828/830/832/834/836, are depicted by way of example but not limitation. As noted heretofore and further described hereafter, the particular type, number and spatial location of stand-alone loudspeakers 806/808/810/812/814, and the related particular number of playback audio signals 828/830/832/834/836, employed at each venue is variable. As will be described in more detail hereafter, the particular number and spatial location of reproduced sound-sources 816-822 employed at each venue is also variable.

Referring again to FIGS. 5, 6 and 8, the particular number and spatial location of different reproduced sound-sources 816-822 employed in the playback sound-field 800 rendered at each venue, and the related particular characteristics of the ACD playback processing 826 performed at each venue are prescribed based on various system attributes including but not limited to the following: (a) the number of bits employed in the venue ID field 504 and channel ID field 506; (b) the number of venues participating in a particular audio conference; and (c) the characteristics of the particular audio output device 802 employed at the venue such as the particular number of stand-alone loudspeakers 806/808/810/812/814 employed and their spatial location.

Referring again to FIGS. 5, 6 and 8, regardless of the particular number and spatial location of reproduced sound-sources 816-822 employed in the playback sound-field 800 rendered at a particular venue, and regardless of the total number of different audio data streams 508 received at the venue from each remote venue, the following guidelines should be followed. Each received audio data stream 508 whose audio data channel 502 includes a left channel audio signal 636 should be mapped to a particular reproduced sound-source generally disposed on the left side of the playback sound-field 800. Each received audio data stream 508 whose audio data channel 502 includes a center channel audio signal 638 should be mapped to a particular reproduced sound-source generally disposed in the center of the playback sound-field 800. Each received audio data stream 508 whose audio data channel 502 includes a right channel audio signal 640 should be mapped to a particular reproduced sound-source generally disposed on the right side of the playback sound-field 800. Whenever a remote venue transmits only a single audio data stream 508, such as the aforementioned venue that has only one conferencees in the party, when this single audio data stream is received the audio data channel 502 contained therein can be mapped to any available reproduced sound-source. The mapping of which audio data channels 502 are assigned to which reproduced sound-sources 816-822 should not change during an audio conference in order to maintain spatial continuity (i.e. audio channel "stationarity") and not confuse the listening party 804.

Referring again to FIGS. 5 and 8, the following is a description of exemplary embodiments of different reproduced sound-source 816-822 configurations and related mappings of received audio data channels 502 to reproduced sound-sources that can be employed in the playback sound-field 800 according to the present technique. This description covers only a very small portion of the many embodiments that could be employed. A simple situation R will first be described in which three different venues are participating in an audio conference. At a particular venue three spatially disposed stand-alone loudspeakers 806, 810 and 814 are employed as the audio output device 802. The first remote venue has only a single conferences in its party and therefore employs a single microphone as the audio input device and transmits only a single audio data stream 508. The second remote venue has a plurality of conferencees in its party and therefore employs the aforementioned sound-field capture microphone array which includes three highly directional, hypercardioid type microphones and transmits three different audio data streams 508 as described heretofore, one for a left channel, one for a center channel and one for a right channel. The audio data channel 502 included in the audio data stream 508 received from the first remote venue could be routed 826 to the center loudspeaker 810 (i.e. mapped to reproduced sound-source 819). The audio data channel 502 included in the left channel audio data stream 508 received from the second remote venue could be routed 826 to the left loudspeaker 806 (i.e. mapped to reproduced sound-source 817). The audio data channel 502 included in the right channel audio data stream 508 received from the second remote venue could be routed 826 to the right loudspeaker 814 (i.e. mapped to reproduced sound-source 821). The audio data channel 502 included in the center channel audio data stream 508 received from the second remote venue could be mapped to reproduced sound-source 818, located midway between the left 806 and center 810 loudspeakers, by processing 826 this audio data as follows. A pair of differentially delayed, partial-amplitude playback audio signals 828/832 can be generated such that one partial-amplitude delayed signal 828 is audibly rendered by the left loudspeaker 806 and the other partial-amplitude differentially delayed signal 832 is audibly rendered by the center loudspeaker 810, thus resulting in the party's 804 perception that this audio data 502 emanates from reproduced sound-source 818.

Referring again to FIGS. 5 and 8, a situation S will now be described in which aforementioned situation R is modified such that a third remote venue is also participating in the audio conference. The third remote venue has a plurality of conferencees in its party and therefore employs the aforementioned sound-field capture microphone array which includes three highly directional, hypercardioid type microphones and transmits three different audio data streams 508 as described heretofore. The audio data channels 502 included in the left channel and right channel audio data streams 508 received from the third remote venue could be respectively mapped to reproduced sound-sources 816 and 822 by employing the aforementioned stereo spatial enhancement processing method in the ACD playback processor 826. The audio data channel 502 included in the center channel audio data stream 508 received from the third remote venue could be mapped to reproduced sound-source 820, located midway between the center 810 and right 814 loudspeakers, by processing 826 this audio data as follows. A pair of differentially delayed, partial-amplitude playback audio signals 832/836 can be generated such that one partial-amplitude delayed signal 832 is audibly rendered by the center loudspeaker 810 and the other partial-amplitude differentially delayed signal 836 is audibly rendered by the right loudspeaker 814, thus resulting in the party's 804 perception that this audio data 502 emanates from reproduced sound-source 820.

Referring again to FIGS. 5 and 8, for situations in which an even larger number of remote venues is participating in the audio conference such that the number of different audio data streams 508 received at a particular venue is larger than the number of different reproduced sound-sources 816-822 available in the playback sound-field 800 at the venue, a plurality of audio data channels 502 could be mapped to a common reproduced sound-source. In an optional embodiment of the present technique the number of different reproduced sound-sources 816-822 available in the playback sound-field 800 at the venue could be increased by employing two additional stand-alone loudspeakers 808 and 812 in the audio output device 802. One loudspeaker 808 would be spatially disposed between the left 806 and center 810 loudspeakers, and the other loudspeaker 812 would be spatially disposed between the center 810 and right 814 loudspeakers. By employing the playback processing 826 methods described heretofore, such a five loudspeaker array 802 could provide for a playback sound-field 800 which includes 11 different reproduced sound-sources (not illustrated). It is noted that such an 11-reproduced-sound-source embodiment would generally only be employed in a large venue so that there would be a reasonable distance between adjacent reproduced sound-sources 816-822.

Referring again to FIGS. 5, 6 and 8, the following are exemplary reasons why the present technique optimizes each party's 804 audible perception of the playback sound-field 800, and more particularly optimizes each party's comprehension of what is discussed during live collaboration with and between remote parties 610-621 and the general effectiveness of the live collaboration between all parties. As described heretofore, the audio signals 636/638/640 captured from remote venues and hence, the respective audio data channels 502 received from these venues, contain the aforementioned necessary ITD and ILD cues so that when the audio data channels are rendered through different reproduced sound-sources 816-822, the listening party 804 can properly audibly perceive where each direct sound in the remote venue's captured sound-field is coming from. As also described heretofore, the audio signals 636/638/640 captured from remote venues and hence, the respective audio data channels 502 received from these venues can contain both time and amplitude panning information. As a result, each party's 804 audible perception of the playback sound-field 800 rendered from these respective audio data channels 502 is substantially the same largely regardless of the particular spatial position of a particular listener in the playback sound-field. In other words, the present technique provides for a wide range of good listening locations within each playback sound-field 800. Furthermore, as a listener 804 moves throughout the playback sound-field 800, the sounds emanating from the different reproduced sound-sources 816-822 which first arrive at the listener's ears are combined such that the listener audibly perceives a "perspective movement" rather than the "snap" the listener typically perceives when they move off-axis in a playback sound-field generated by a conventional two-channel stereo rendering. As also described heretofore, the high degree of directionality associated with the hypercardioid type microphones 602/604/606 used at the remote venues ensures that each microphone captures a different reverberant field. Thus, when the audio data channels 502 corresponding to the captured audio signals 636/638/640 are received and rendered through different reproduced sound-sources 816-822 in the manner described heretofore, the sound emanating from each reproduced sound-source in the playback sound-field 800 will contain a de-correlated reverberant component. Therefore, at least some de-correlation of the remote capture venue's reverberation (i.e. indirect sound) will occur at each listener's 804 ears, thus allowing each listener to "hear through" the playback sound-field 800 in a natural manner as if the listener were situated in the remote capture venue.

Referring again to FIG. 2, in another embodiment of the present technique a stereo pair of stand-alone loudspeakers (not illustrated) can be employed as the audio output device in the audio playback module 226 at a particular venue 200/202/ 204/206. The pair of stand-alone loudspeakers is disposed in front of the party 210/212/214/216, where one loudspeaker is disposed on the left side of the venue and the other loudspeaker is symmetrically disposed on the right side of the venue. However, it is noted that in this embodiment the range of good listening locations within the playback sound-field 230/238/240/242 is narrower than that for the aforementioned embodiment that employs a surround-sound speaker system including three or more stand-alone loudspeakers as the audio output device.

Figure 11B:
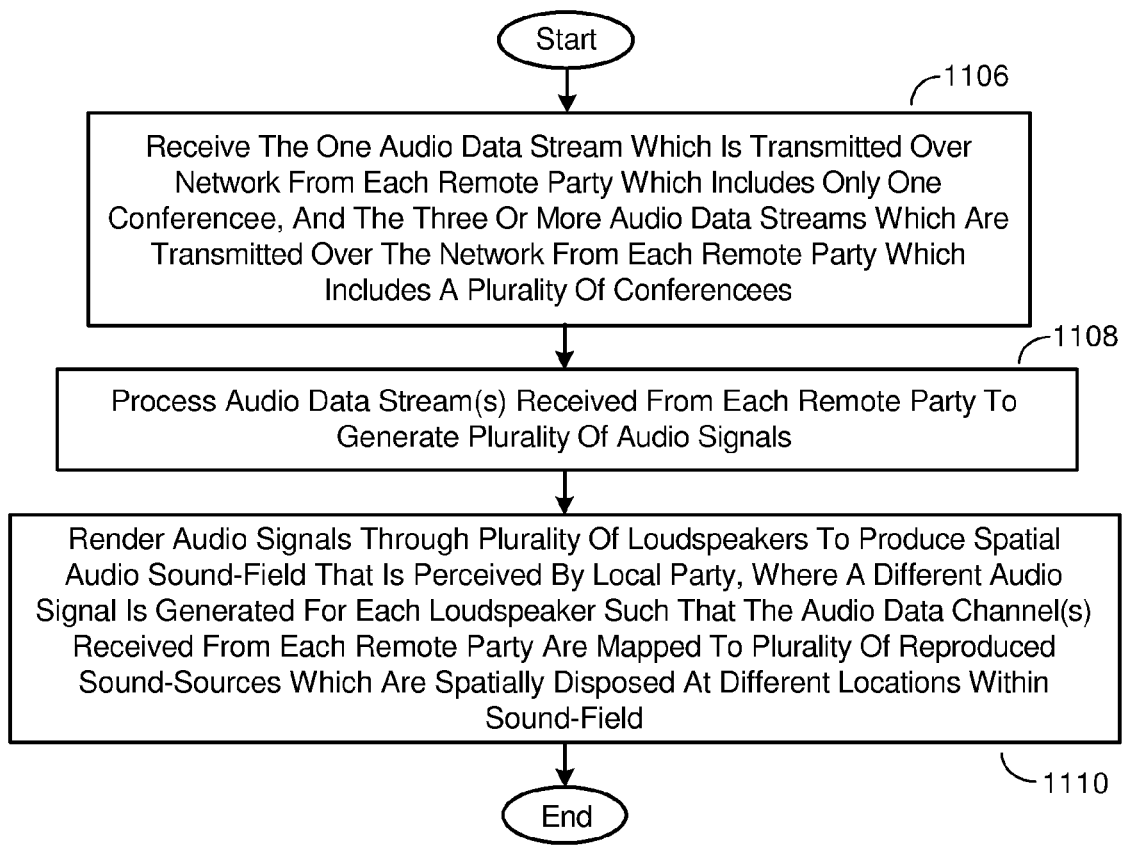

FIG. 11B illustrates an exemplary embodiment of a process for performing the network reception and audio rendering operations associated with providing a spatial audio conference between a local party and one or more remote parties according to the SFC method of the present technique. The process starts with receiving the one audio data stream which is transmitted over the network from each remote party which includes only one conferencee, and the three or more audio data streams which are transmitted over the network from each remote party which includes a plurality of conferencees 1106. The audio data stream(s) received from each remote party are then processed in order to generate a plurality of audio signals 1108. The audio signals are then rendered through a plurality of loudspeakers in order to produce a spatial audio sound-field that is audibly perceived by the local party, where a different audio signal is generated for each loudspeaker such that the audio data channel(s) received from each remote party are mapped to a plurality of reproduced sound-sources which are spatially disposed at different locations within the sound-field 1110.

3.0 Additional Embodiments

While the present technique has been described in detail by specific reference to embodiments thereof, it is understood that variations and modifications thereof may be made without departing from the true spirit and scope of the present technique. It is noted that any or all of the aforementioned embodiments may be used in any combination desired to form additional hybrid embodiments. Although the present technique has been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

Wherefore, what is claimed is:

1. A system for providing a spatial audio conference between a local party and one or more remote parties, wherein each party is situated at a different venue, and each party comprises either a single conferencee or a plurality of co-situated conferencees, comprising:
    a plurality of audio conferencing devices (ACDs) which are interconnected by a network, wherein each venue comprises an ACD, and each ACD comprises:
        a general purpose computing device,
        an audio input device, and
        an audio output device; and
    a computer program having program modules executable by each ACD, comprising:
        a capture module for using the input device to capture spatial audio information from a captured sound-field emanating from the local party, and processing the captured audio information to generate a single audio data stream which comprises the captured audio information,
        a network communications module for transmitting the single audio data stream over the network to each remote party, and receiving a single audio data stream which is transmitted over the network from each remote party and which comprises captured spatial audio information from a captured sound-field emanating from the remote party associated with the received audio data stream, and
        a playback module for processing the audio data stream received from each remote party to generate a plurality of output audio signals, and rendering said output audio signals through the output device to produce a playback sound-field which is perceived by the local party, wherein the playback sound-field comprises the spatial audio information captured from the remote parties; wherein
        each audio data stream comprises:
            monaural audio data, and
            a captured sound-source identification (ID) metadata header which is appended to the monaural audio data, wherein the metadata header identifies one or more captured sound-sources for the monaural audio data.

2. The system of claim 1, wherein the playback module comprises an audio processing application programming interface (API) which performs the processing of the audio data stream received from each remote party.

3. The system of claim 1, wherein,
    the metadata comprises a venue ID field which identifies the particular venue the monaural audio data is emanating from, and
    whenever the local party comprises a single conferencee, the audio input device comprises a single microphone which captures a single input audio signal from the captured sound-field, and the capture module processes the input audio signal to translate it into the monaural audio data.

4. The system of claim 1, wherein the metadata comprises:
    a venue ID field which identifies the particular venue the monaural audio data is emanating from; and
    a direction ID field comprising,
        a direction ID which identifies a particular direction, within the captured sound-field, that the monaural audio data is emanating from at each point in time, and
        information which identifies whether or not the spatial audio information was captured from a near-field region of the captured sound-field.

5. The system of claim 4, wherein,
    whenever the local party comprises a plurality of conferencees, the audio input device comprises one of,
        an array of two or more directional microphones which capture two or more different input audio signals from the captured sound-field, or
        a video camera comprising an integrated microphone, wherein the camera tracks the conferencee in the local party that is currently talking and the integrated microphone captures an input audio signal from the captured sound-field, whenever the audio input device comprises the array of two or more directional microphones, the capture module processes the two or more different input audio signals to, calculate a particular location, within the captured sound-field, of the conferencee in the local party that is currently talking and generate the direction ID accordingly, and translate the different input audio signals into the monaural audio data, and whenever the audio input device comprises the video camera, the capture module uses current position information for the camera to calculate the direction ID for the conferencee in the local party that is currently talking, and processes the input audio signal to translate it into the monaural audio data.

6. The system of claim 1, wherein, the audio output device comprises one of, stereo headphones comprising a pair of integrated loudspeakers which are disposed onto the ears of each conferencee in the local party, or a plurality of stand-alone loudspeakers configured in an array which is disposed either in front of, or around the periphery of, the local party, the playback module generates a different output audio signal for each loudspeaker and each output audio signal is rendered by a different loudspeaker, the different output audio signals are generated such that one or more captured sound-sources identified for the monaural audio data received from each remote party are mapped to a plurality of reproduced sound-sources which are spatially disposed at different locations within the playback sound-field, and the particular number and spatial location of the reproduced sound-sources employed at each venue is variable and is prescribed based on system attributes comprising, the total number of remote parties, the particular type of audio output device employed at the venue, and the particular number of loudspeakers in the audio output device.

7. A system for spatializing audio in an audio conference between a local party and one or more remote parties, wherein each party comprises either a single conferencee or a plurality of co-situated conferencees, comprising:

a plurality of audio conferencing devices (ACDs) which are interconnected by a network, wherein each party uses an ACD, and each ACD comprises:

a general purpose computing device, and an audio output device comprising a plurality of loudspeakers; and a computer program having program modules executable by each ACD, comprising:

a network communications module for receiving an audio data stream from each remote party over the network, wherein each audio data stream comprises monaural audio data, and a metadata header which identifies one or more captured sound-sources for the monaural audio data and whether or not the monaural audio data was captured from a near-field region of a captured sound-field emanating from the remote parties, and a playback module for processing each audio data stream received from the remote parties to generate a different audio signal for each loudspeaker, and for rendering each audio signal through its respective loudspeaker to produce a spatial audio sound-field which is audibly perceived by each conferencee in the local party.

8. The system of claim 7, wherein, the audio output device further comprises one of, stereo headphones comprising a pair of integrated loudspeakers which are disposed onto the ears of each conferencee in the local party, or an array of stand-alone loudspeakers which are disposed either in front of, or around the periphery of, the local party, and the playback module comprises, a time delay stage, and a gain adjustment stage.

9. The system of claim 8, wherein whenever the audio output device comprises stereo headphones, the playback module employs a headphone sound-field virtualization method to generate a left-channel audio signal and a right-channel audio signal, such that the one or more captured sound-sources identified for the monaural audio data received from each remote party are perceived, by each conferencee in the local party, to emanate from different locations within the spatial audio sound-field, and the particular location for each captured sound-source does not change during the audio conference.

10. The system of claim 8, wherein whenever the audio output device comprises the array of stand-alone loudspeakers, the different audio signal for each loudspeaker is generated such that the captured sound-sources identified for the monaural audio data received from each remote party are mapped to a plurality of reproduced sound-sources which are spatially disposed at different locations within the spatial audio sound-field, and wherein, said different locations of the reproduced sound-sources comprise, directly in front of each loudspeaker, midway between any two loudspeakers, to the left of the left-most loudspeaker from the perspective of the local party, and to the right of the right-most loudspeaker from the perspective of the local party, the particular mapping of captured sound-sources to reproduced sound-sources does not change during the audio conference, whenever the metadata header for a particular audio data stream received from a particular remote party identifies that the monaural audio data in said stream was captured from a near-field region of a captured sound-field emanating from said remote party, the captured sound-field is simulated by, using the time delay stage to calculate a prescribed time delay adjustment for said monaural audio data, using the gain adjustment stage to calculate a prescribed gain adjustment for said monaural audio data, and for each captured sound-source identified for said monaural audio data, mapping a non-adjusted version of the captured sound-source to one particular reproduced sound-source, and commonly mapping a time delay and gain adjusted version of the captured sound-source to at least three other reproduced sound-sources, and whenever the metadata identifies more than two captured sound-sources for the monaural audio data, said captured sound-sources are mapped to reproduced sound-sources in a manner which results in equal separation between each of said captured sound-sources.

11. The system of claim 10, wherein,
the playback module further comprises a filter stage which is used to analyze the voice properties of the monaural audio data received from each remote party, wherein the filter stage comprises a head-related transfer function measurement for a prototypical conferencee, and
whenever different captured sound-sources identified for the monaural audio data have similar voice properties, these different captured sound-sources are mapped to reproduced sound-sources which are spaced far apart in the spatial audio sound-field.

12. A system for providing a spatial audio conference between a local party and one or more remote parties, wherein each party is situated at a different venue, and each party comprises either a single conferencee or a plurality of co-situated conferencees, comprising:
a plurality of audio conferencing devices (ACDs) which are interconnected by a network, wherein each venue comprises an ACD, and each ACD comprises:
a general purpose computing device,
an audio input device, and
an audio output device; and
a computer program having program modules executable by each ACD, comprising:
a capture module for using the input device to capture spatial audio information from a captured sound-field emanating from the local party, and processing the captured audio information to generate one audio data stream whenever the local party comprises only one conferencee, and three or more audio data streams whenever the local party comprises a plurality of conferencees, wherein the generated audio data stream(s) comprise the captured audio information,
a network communications module for transmitting the generated audio data stream(s) over the network to each remote party, and receiving a single audio data stream which is transmitted over the network from each remote party comprising only one conferencee, and three or more audio data streams which are transmitted over the network from each remote party comprising a plurality of conferencees, each of said remote party audio data streams comprising captured spatial audio information from a captured sound-field emanating from the remote part associated with the received audio data stream, and
a playback module for processing the audio data stream(s) received from each remote party to generate a plurality of output audio signals, and rendering said output audio signals through the output device to produce a playback sound-field which is perceived by the local party, wherein the playback sound-field comprises the spatial audio information captured from the remote parties; wherein each audio data stream comprises:
monaural audio data, and
a captured sound-source identification (ID) metadata header which is appended to the monaural audio data, wherein the metadata header identifies one or more captured sound-sources for the monaural audio data.

13. The system of claim 12, wherein the playback module comprises an audio processing application programming interface (API) which performs the processing of the audio data stream(s) received from each remote party.

14. The system of claim 12, wherein
the metadata header comprises:
a venue ID field which identifies the particular venue the audio data channel is emanating from, and
a channel ID field which identifies a directional orientation within the captured sound-field.

15. The system of claim 14, wherein,
the venue ID field has a bit-length which is variable, wherein said bit- length is prescribed based on an expected maximum number of different venues, and
the channel ID field has a bit-length which is variable, wherein said bit-length is prescribed based on an expected maximum number of audio data streams to be transmitted from a party.

16. The system of claim 14, wherein,
whenever the local party comprises a single conferencee,
the audio input device comprises a single microphone which captures a single input audio signal from the captured sound-field,
the capture module processes the input audio signal to translate it into the audio data channel,
the channel ID field identifies that said audio data channel is the only one that was captured from the local party,
the capture module accordingly generates a single audio data stream, and
the network communications module accordingly transmits the single audio data stream to each remote party, and
whenever the local party comprises a plurality of conferencees,
the audio input device comprises a sound-field capture device comprising an array of three or more microphones which accordingly capture three or more different input audio signals from the captured sound-field,
the capture module processes each different input audio signal to translate it into an audio data channel such that three or more different audio data channels are generated,
the channel ID field for each audio data channel identifies the directional orientation within the captured sound-field for the particular microphone which captured the particular input audio signal that resulted in said audio data channel,
the capture module accordingly generates three or more different audio data streams, and
the network communications module accordingly transmits the three or more different audio data streams to each remote party.

17. The system of claim 14, wherein,
the audio output device comprises stereo headphones comprising a pair of integrated loudspeakers which are disposed onto the ears of each conferencee in the local party,
the playback module generates a different output audio signal for each loudspeaker and each output audio signal is rendered by a different loudspeaker,
the playback module employs a headphone sound-field virtualization method to generate a left-channel audio signal and a right-channel audio signal, such that each of the audio data channels received from each remote party are perceived, by each conferencee in the local party, to emanate from different locations within the playback sound-field, and the particular location for each audio data channel does not change during the audio conference.

18. The system of claim 14, wherein,
the audio output device comprises three or more stand-alone loudspeakers configured in an array which is disposed either in front of, or around the periphery of, the local party,
the playback module generates a different output audio signal for each loudspeaker and each output audio signal is rendered by a different loudspeaker,
the different output audio signal for each loudspeaker is generated such that the audio data channels received from each remote party are mapped to a plurality of reproduced sound-sources which are spatially disposed at different locations within the playback sound-field, and wherein,
said different locations of the reproduced sound-sources comprise,
directly in front of each loudspeaker,
midway between any two loudspeakers,
to the left of the left-most loudspeaker from the perspective of the local party, and
to the right of the right-most loudspeaker from the perspective of the local party,
each audio data channel is mapped to a particular reproduced sound- source having a directional orientation within the playback sound-field that is the same as the directional orientation identified in the channel ID field, and
the mapping of audio data channels to reproduced sound-sources does not change during the audio conference.

19. A sound-field capture device for capturing spatial audio information from a sound-field, comprising:
at least three microphones configured in a semicircular array, wherein,
each microphone comprises a sound capture element which is directional, and
the microphones are disposed symmetrically about a center axis such that each sound capture element captures sound-waves emanating from a different portion of the sound-field, and wherein,
whenever the sound-field emanates from a plurality of conferencees which are sitting around a table,
the microphones are vertically positioned such that the sound capture elements are disposed along a horizontal plane formed by the average height of the mouths of the conferencees, and
the microphones are horizontally positioned such that the sound capture elements are disposed at the center of one end of the table, and
whenever the sound-field emanates from a plurality of conferencees which are disposed at various locations throughout a venue,
the microphones are vertically positioned such that the sound capture elements are disposed along a horizontal plane formed by the average height of the mouths of the conferencees, and
the microphones are horizontally positioned such that the sound capture elements are disposed at the center of the front of the venue.

20. The device of claim 19, wherein the device comprises exactly three microphones.

21. The device of claim 19, wherein the device comprises more than three microphones.

22. The device of claim 19, wherein,
the distance between the sound capture element of the microphone disposed on the left-most side of the array and the sound capture element of the microphone disposed on the right-most side of the array approximates the time delay between ears on a typical adult human head, and
the microphones comprise hypercardioid type microphones.

23. A computer-implemented process for providing a spatial audio conference between a local party and one or more remote parties, comprising using a computing device to perform the following process actions:
capturing spatial audio information emanating from the local party;
processing the captured spatial audio information to generate one audio data stream whenever the local party comprises only one conferencee, and three or more audio data streams whenever the local party comprises a plurality of conferencees, wherein each stream comprises an audio data channel and a captured sound-source identification metadata header which is appended to the audio data channel, wherein the metadata header identifies attributes of the audio data comprising a directional orientation within the captured spatial audio information;
transmitting the generated audio data stream(s) over a network to each remote party;
receiving the one audio data stream which is transmitted over the network from each remote party comprising only one conferencee, and the three or more audio data streams which are transmitted over the network from each remote party comprising a plurality of conferencees;
processing said audio data stream(s) received from each remote party to generate a plurality of audio signals; and
rendering said audio signals through a plurality of loudspeakers to produce a spatial audio sound-field that is perceived by the local party, wherein said audio signals comprise a different audio signal for each loudspeaker, and wherein each different audio signal is generated such that the audio data channel(s) received from each remote party are mapped to a plurality of reproduced sound-sources which are spatially disposed at different locations within the spatial audio sound-field.

* * * * *

UNITED STATES PATENT AND TRADEMARK OFFICE
CERTIFICATE OF CORRECTION

PATENT NO.         : 8,073,125 B2
APPLICATION NO.    : 11/861238
DATED              : December 6, 2011
INVENTOR(S)        : Zhengyou Zhang et al.

Page 1 of 1

It is certified that error appears in the above-identified patent and that said Letters Patent is hereby corrected as shown below:

In column 30, line 11, in Claim 15, delete "bit- length" and insert -- bit-length --, therefor.

Signed and Sealed this
Thirty-first Day of January, 2012

David J. Kappos
*Director of the United States Patent and Trademark Office*